United States Patent
Kakoee et al.

(10) Patent No.: US 11,250,124 B2
(45) Date of Patent: Feb. 15, 2022

(54) ARTIFICIAL REALITY SYSTEM HAVING HARDWARE MUTEX WITH PROCESS AUTHENTICATION

(71) Applicant: Facebook Technologies, LLC, Menlo Park, CA (US)

(72) Inventors: Reza Kakoee, Fremont, CA (US); Jun Wang, San Jose, CA (US); Sneha Sharma, San Jose, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 152 days.

(21) Appl. No.: 16/685,683

(22) Filed: Nov. 15, 2019

(65) Prior Publication Data

US 2021/0089642 A1 Mar. 25, 2021

Related U.S. Application Data

(60) Provisional application No. 62/902,911, filed on Sep. 19, 2019.

(51) Int. Cl.
| | |
|---|---|
| *G08B 23/00* | (2006.01) |
| *G06F 12/16* | (2006.01) |
| *G06F 12/14* | (2006.01) |
| *G06F 11/00* | (2006.01) |
| *G06F 21/52* | (2013.01) |
| *G06F 21/44* | (2013.01) |
| *G06F 9/52* | (2006.01) |

(52) U.S. Cl.
CPC .............. *G06F 21/52* (2013.01); *G06F 9/526* (2013.01); *G06F 21/44* (2013.01); *G06F 2221/033* (2013.01)

(58) Field of Classification Search
CPC .......... G06F 21/52; G06F 9/526; G06F 21/44; G06F 2221/033
USPC .......................................................... 726/23
See application file for complete search history.

(56) References Cited

U.S. PATENT DOCUMENTS

| | | | |
|---|---|---|---|
| 6,247,143 B1 * | 6/2001 | Williams | G06F 9/52 714/11 |
| 6,499,048 B1 * | 12/2002 | Williams | G06F 9/52 718/102 |
| 9,733,999 B1 * | 8/2017 | Frost | G06F 9/546 |

(Continued)

OTHER PUBLICATIONS

Suresh Kothari; Let's Verify Linux: Accelerated Learning of Analytical Reasoning through Automation and Collaboration; ACM:2016; pp. 394-403.*

(Continued)

*Primary Examiner* — Monjur Rahim
(74) *Attorney, Agent, or Firm* — Shumaker & Sieffert, P.A.

(57) ABSTRACT

This disclosure describes hardware-based mutexes that employ software process authentication to prevent a software process from releasing the lock of a mutex locked by another software process. For example, systems are described in which a mutex controller receives a request from a process to lock a mutex. The mutex controller locks the mutex, writing a process key and process identifier to one or more hardware registers associated with the mutex. If the mutex controller receives a request to release the lock on the mutex, the mutex controller determines if the key received with the request matches the process key written in the one or more hardware registers of the mutex and, if so, releases the lock on the mutex.

29 Claims, 14 Drawing Sheets

(56) References Cited

U.S. PATENT DOCUMENTS

| | | | |
|---|---|---|---|
| 2003/0041173 A1* | 2/2003 | Hoyle | G06F 9/526 709/248 |
| 2005/0060710 A1* | 3/2005 | Kush | G06F 9/524 718/103 |
| 2006/0048162 A1* | 3/2006 | Boult | G06F 9/30072 719/310 |
| 2006/0117316 A1* | 6/2006 | Cismas | G06F 9/463 718/103 |
| 2010/0122253 A1* | 5/2010 | McCart | G06F 8/458 718/100 |
| 2010/0191711 A1* | 7/2010 | Carey | G06F 9/5027 707/704 |
| 2013/0055284 A1* | 2/2013 | Sabato | G06F 9/526 718/106 |
| 2013/0305259 A1* | 11/2013 | Wang | G06F 9/461 718/106 |
| 2015/0121402 A1* | 4/2015 | Pajuelo Gonzalez | G06F 9/5011 719/328 |
| 2015/0205646 A1* | 7/2015 | Singh | G06F 9/526 718/106 |
| 2015/0319183 A1* | 11/2015 | Liske | G06F 21/566 726/23 |
| 2017/0371578 A1* | 12/2017 | Wu | G06F 9/528 |
| 2020/0001471 A1* | 1/2020 | Chen | B25J 13/081 |

OTHER PUBLICATIONS

"Mutex Core," Altera Corporation: Quartus II Handbook Version 9.1 vol. 5: Embedded Peripherals, Chapter 27, Nov. 2009, 6 pp.

"Mutex.GetAccess Control Method," Microsoft Docs Retrieved from: https://docs.microsoft.com/en-us/dotnet/api/system.threading.mutex.getaccesscontrol?view=netframework-4.8&viewFallbackFrom=netframework-...9%2F4%2F2019, Accessed Sep. 4, 2019, 6 pp.

"UnauthorizedAccessException when trying to open a mutex," Stack Overflow, Retrieved from: https://stackoverflow.com/questions/19536697/unauthorizedaccessexception%E2%80%90when%E2%80%90trying%E2%80%90to%E2%80%90open%E2%80%90a%E2%80%90mutex, Accessed Sep. 4, 2019, 5 pp.

Tan et al. "Towards decentralized system-level security for MPSoC-based embedded applications," Elsevier; Journal of Systems Architecture, vol. 80, Oct. 2017, 15 pp.

* cited by examiner

ARTIFICIAL REALITY SYSTEM HAVING HARDWARE MUTEX WITH PROCESS AUTHENTICATION

This application claims the priority benefit of U.S. Provisional Patent Application Ser. No. 62/902,911, filed Sep. 19, 2019, the entire contents of which is incorporated herein by reference.

TECHNICAL FIELD

This disclosure generally relates to artificial reality systems and, in particular, techniques for controlling access by software processes to shared resources.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may include completely generated content or generated content combined with captured content (e.g., real-world video and/or images). During operation, the user typically interacts with the artificial reality system to select content, launch an application or otherwise configure the system. When executing, an artificial reality application typically takes control over the entire display, i.e., field of view of the user, and renders 3D content for the entire display, thereby providing an artificial reality experience. If desired, the user interacts with the artificial reality system to close an application and launch a different artificial reality application, which assumes control of the entire display and generates its own 3D content for the entire display.

SUMMARY

In general, applications executing in artificial reality systems often require access to shared resources (such as shared sections of memory). This disclosure describes hardware-based mutexes used to limit or prevent simultaneous access to shared resources by software processes. Moreover, as described herein, the mutexes employ software process authentication to prevent a software process from releasing the lock of a mutex locked by another software process. In some examples, the hardware mutexes may be deployed in a distributed architecture for an artificial reality (AR) system in which multiple processors in one or more systems-on-chip (SoCs) simultaneously execute one or more software processes.

In one example, an artificial reality system includes a storage device, one or more mutexes, and processing circuitry connected to the storage device and the mutexes. Each mutex is associated with one or more registers. The processing circuitry is configured to receive, from a software process having a process identifier, a request to release a lock on a selected mutex, wherein the request includes a key, wherein the key is associated with the software process and is different from the process identifier. The processing circuitry is further configured to read a value stored in a key field of the one or more hardware registers associated with the selected mutex and to release the lock on the selected mutex if the value matches the key.

In another example, an artificial reality system includes a storage device, one or more mutexes, and processing circuitry connected to the storage device and the mutexes. Each mutex is associated with one or more registers. The processing circuitry is configured to receive, from a software process, a request to lock a selected one of the mutexes, wherein the request includes a process identifier associated with the software process, to determine if the selected mutex is unlocked, to obtain a process key associated with the software process, and, if the selected mutex is unlocked, to lock the selected mutex, wherein locking the selected mutex includes writing the process key and the process identifier to one of the one or more hardware registers associated with the selected mutex.

In yet another example, a method includes receiving, from a software process, a request to lock a mutex, the mutex implemented in one or more hardware registers, wherein the request includes a process identifier associated with the software process. The method further includes obtaining a process key associated with the software process, determining if the mutex is unlocked, and, if the mutex is unlocked, locking the mutex, wherein locking the mutex includes writing the process key and the process identifier to one of the one or more hardware registers of the mutex.

In yet another example, a method includes receiving, from a software process having a process identifier, a request to release a lock on a mutex, the mutex implemented using one or more hardware registers, wherein the request includes a key, wherein the key is associated with the software process and is different from the process identifier. The method further includes reading a value stored in a key field of one of the one or more hardware registers of the mutex and releasing the lock on the mutex if the value matches the key.

In yet another example, a non-volatile computer-readable storage medium includes instructions that, when executed by a processor, configure the processor to receive, from a software process, a request to lock a mutex. The request includes a process identifier associated with the software process. The mutex is implemented in one or more hardware registers. The non-volatile computer-readable storage medium also includes instructions that, when executed by a processor, configure the processor to obtain a process key associated with the software process, determine if the mutex is unlocked, and, if the mutex is unlocked, lock the mutex by writing the process key and the process identifier to one of the one or more hardware registers of the mutex.

In yet another example, a non-volatile computer-readable storage medium includes instructions that, when executed by a processor, configure the processor to receive, from a software process having a process identifier, a request to release a lock on a mutex. The mutex is implemented using one or more hardware registers; the request includes a key; and the key is associated with the software process and is different from the process identifier. The non-volatile computer-readable storage medium also includes instructions that, when executed by a processor, configure the processor, to read a value stored in a key field of one of the one or more hardware registers of the mutex and to release the lock on the mutex if the value matches the key.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Artificial reality systems are described herein in which software processes use hardware-based mutexes to lock access to a shared resource so that the software process locking the mutex gains sole access to the shared resource. A software process may, for instance, use the mutex to synchronize access to a critical section/resource between different applications running on the same or different coprocessors or processors. The software process that locked the mutex retains sole access to the shared resource until the software process releases the lock. Once locked, no other software process should attempt to access the locked resource. In the following disclosure, technical solutions are described in which hardware-based mutexes within integrated circuits use software process authentication to prevent a software process from releasing the lock of a mutex locked by another software process and to prevent a software process from writing to a shared resource associated with a mutex locked by another software process.

Figure 1A:
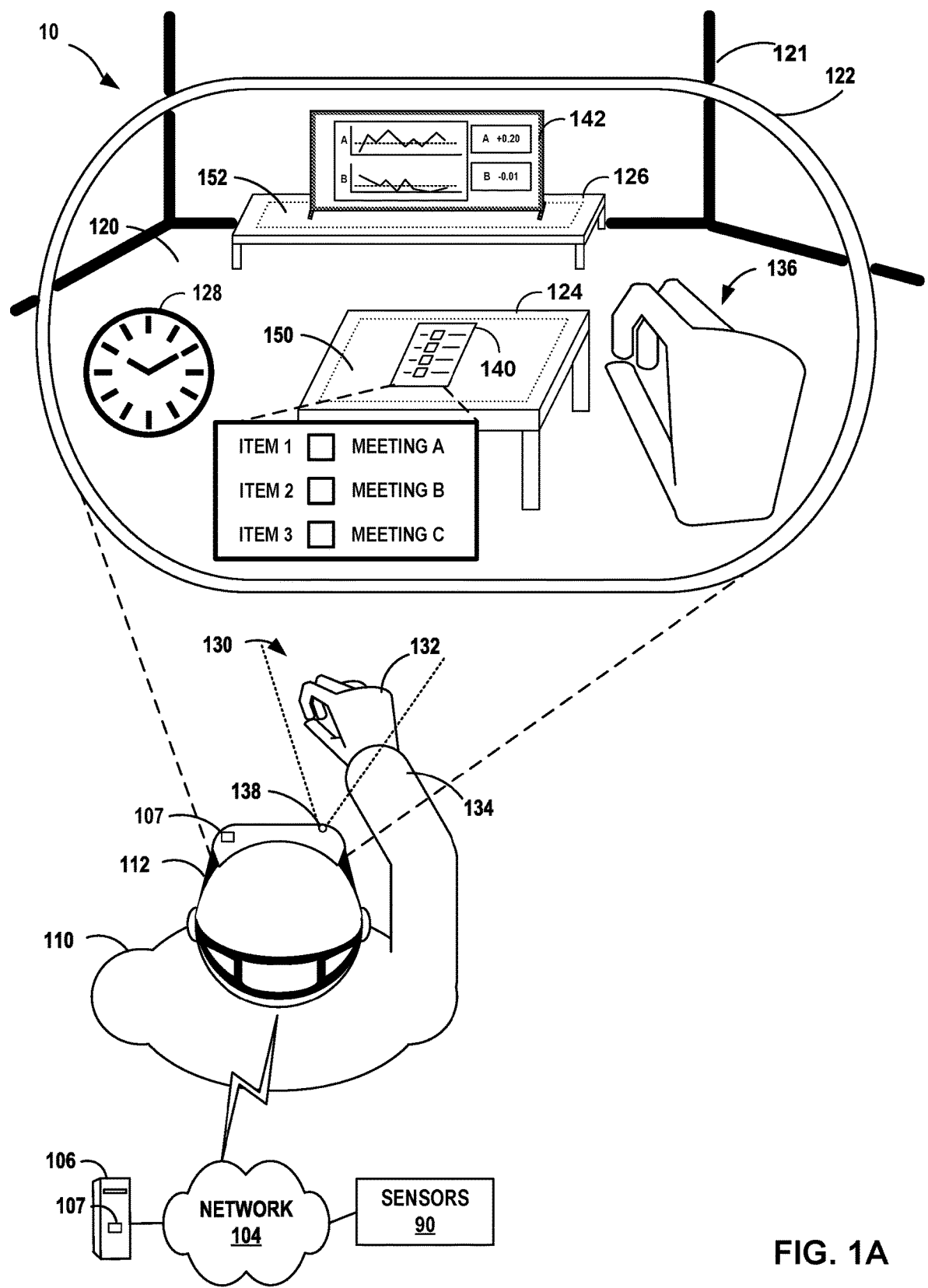
FIG. 1A is an illustration depicting an example artificial reality system having hardware-based mutexes that use process authentication when protecting access to selected resources shared by software processes, in accordance with the techniques of the disclosure.

FIG. 1A is an illustration depicting an example artificial reality system having hardware-based mutexes that use process authentication when protecting access to selected resources shared by software processes, in accordance with the techniques of the disclosure. In the example of FIG. 1A, artificial reality system 10 includes head mounted device (HMD) 112, console 106 and, in some examples, one or more external sensors 90.

As shown, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD and may include one or more image capture devices 138, e.g., cameras, line scanners and the like, for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as Wi-Fi, a mesh network or a short-range wireless communication medium. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, user 110 views the artificial reality content 122 constructed and rendered by an artificial reality application executing on console 106 and/or HMD 112. In some examples, artificial reality content 122 may comprise a mixture of real-world imagery (e.g., hand 132, earth 120, wall 121) and virtual objects (e.g., virtual content items 124, 126, 140 and 142). In the example of FIG. 1A, artificial reality content 122 comprises virtual content items 124, 126 representing virtual tables; virtual content items 124, 126 may be mapped (e.g., pinned, locked, placed) to a particular position within artificial reality content 122. Similarly, artificial reality content 122 comprises virtual content item 142 that represents a virtual display device that is also mapped to a particular position within artificial reality content 122. A position for a virtual content item may be fixed, as relative to a wall or the earth, for instance. A position for a virtual content item may be variable, as relative to a user, for instance. In some examples, the particular position of a virtual content item within artificial reality content 122 is associated with a position within the real-world, physical environment (e.g., on a surface of a physical object).

In the example artificial reality experience shown in FIG. 1A, virtual content items 124, 126 are mapped to positions on the earth 120 and/or wall 121. The artificial reality system 10 may render one or more virtual content items in response to a determination that at least a portion of the location of virtual content items is in the field of view 130 of user 110. That is, virtual content appears only within artificial reality content 122 and does not exist in the real-world, physical environment.

During operation, one or more artificial reality applications construct artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, each artificial reality application renders 3D artificial reality content which, in some examples, may be overlaid, at least in part, upon the real-world, 3D physical environment of user 110. During this process, one or more of the artificial reality applications use sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality applications determine a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. In some examples, the artificial reality application may render images of real-world objects, such as the portions of hand 132 and/or arm 134 of user 110, that are within field of view 130 along with the virtual objects, such as within artificial reality content 122. In other examples, the artificial reality application may render virtual representations of the portions of hand 132 and/or arm 134 of user 110 that are within field of view 130 (e.g., render real-world objects as virtual objects) within artificial reality content 122. In either example, user 110 is able to view the portions of their hand 132, arm 134, and/or any other real-world objects that are within field of view 130 within artificial reality content 122. In other examples, the artificial reality application may not render representations of the hand 132 or arm 134 of the user.

During operation, artificial reality system 10 performs object recognition within image data captured by image capture devices 138 of HMD 112 to identify hand 132, including optionally identifying individual fingers or the thumb, and/or all or portions of arm 134 of user 110. Further, artificial reality system 10 tracks the position, orientation, and configuration of hand 132 (optionally including particular digits of the hand), and/or portions of arm 134 over a sliding window of time.

In general, artificial reality system 10 often includes multiple software applications executing in parallel on one or more processors or processor cores, where each of the software applications access various shared resources. For example, in one example approach, artificial reality applications may include different types of artificial reality software applications, such as environment applications, placed applications, and floating applications. Environment applications may define a scene for the AR environment that serves as a backdrop for one or more applications to become active. For example, environment applications place a user in the scene, such as a beach, office, environment from a fictional location (e.g., from a game or story), environment of a real location, or any other environment. In the example of FIG. 1A, the environment application provides a living room scene within artificial reality content 122.

A placed application is a fixed application that is expected to remain rendered (e.g., no expectation to close the applications) within artificial reality content 122. For example, a placed application may include surfaces to place other objects, such as a table, shelf, or the like. In some examples, a placed application includes decorative applications, such as pictures, candles, flowers, game trophies, or any ornamental item to customize the scene. In some examples, a placed application includes functional applications (e.g., widgets) that allow quick glancing at important information (e.g., agenda view of a calendar). In the example of FIG. 1A, artificial reality content 122 includes virtual tables 124 and 126 that include surfaces to place other objects.

A floating application may include an application implemented on a "floating window." For example, a floating application may include 2D user interfaces, 2D applications (e.g., clock, calendar, etc.), or the like. In the example of FIG. 1A, a floating application may include clock application 128 that is implemented on a floating window within artificial reality content 122. In some examples, floating applications may integrate 3D content. For example, a floating application may include a flight booking application that provides a 2D user interface to view and select from a list of available flights and that is integrated with 3D content such as a 3D visualization of a seat selection. As another example, a floating application may be a chemistry teaching application that provides a 2D user interface of a description of a molecule and also shows 3D models of the molecules. In another example, a floating application may be a language learning application that may also show a 3D model of objects with the definition and/or 3D charts for learning progress. In a further example, a floating application may be a video chat application that shows a 3D reconstruction of the face of the person on the other end of the line.

In some examples, artificial reality system 10 detects gestures to objects performed by user 110 and, in response to detecting one or more particular gestures, performs an action on one or more objects (e.g., moving or scaling the object). More specifically, artificial reality system 10 performs object recognition within image data captured by image capture devices 138 of HMD 112 to identify hand 132, including optionally identifying individual fingers or the thumb, and/or all or portions of arm 134 of user 110. Artificial reality system 10 tracks the position, orientation, and configuration of hand 132 (optionally including particular digits of the hand) and/or portions of arm 134 over a sliding window of time. The artificial reality system 10 analyzes any tracked motions, configurations, positions, and/or orientations of hand 132 and/or portions of arm 134 to identify one or more gestures performed by particular objects, e.g., hand 132 (including particular digits of the hand) and/or portions of arm 134 of user 110. To detect the gesture(s), the artificial reality application may compare the motions, configurations, positions and/or orientations of hand 132 and/or portions of arm 134 to gesture definitions stored in a gesture library of artificial reality system 10, where each gesture in the gesture library may be each mapped to one or more actions. In some examples, detecting movement may include tracking positions of one or more of the digits (individual fingers and thumb) of hand 132, including whether any of a defined combination of the digits (such as an index finger and thumb) are brought together to touch or approximately touch in the physical environment. In other examples, detecting movement may include tracking an orientation of hand 132 (e.g., fingers pointing toward HMD 112 or away from HMD 112) and/or an orientation of arm 134 (i.e., the normal of the arm facing toward HMD 112) relative to the current pose of HMD 112. The position and orientation of hand 132 (or a portion thereof) may alternatively be referred to as the pose of hand 132 (or a portion thereof).

In the example of FIG. 1A, artificial reality system 10 may detect one or more gestures intended to trigger a desired response by the artificial reality application, such as selecting and translating (e.g., moving) objects of the scene. In some example approaches, artificial reality system 10 may detect a series of gestures, such as a selection gesture (e.g., pinching) on agenda object 142, a translation gesture to move agenda object 142 out of offer area 150, and deselection gesture to release agenda object 142 in another location within the offer area or to another offer area within the artificial reality content.

In accordance with the techniques of this disclosure, artificial reality system 10 includes one or more mutexes 107 used to control access to shared resources within the artificial reality system 10. As shown in FIG. 1, mutexes 107 may, for example, be utilized within a computing environment associated with console 106, HMD 112, or both. In one example approach, artificial reality system 10 includes two or more artificial reality applications concurrently executing within the artificial reality system 10. For example, artificial reality system 10 may present artificial reality content depicting a common scene of an artificial reality environment that is collaboratively constructed and simultaneously controlled by multiple artificial reality applications concurrently executing within the artificial reality system 10. In one example, aspects of the common scene are handled and processed utilizing one or more shared resources (e.g., memory, rendering resources, optical display elements) for which a respective hardware mutex 107 is used to control access by the artificial reality applications. Moreover, as described herein, the artificial reality system utilizes process authentication to access and control each hardware mutex 107. In one example approach, any given hardware mutex 107 used by the multiple artificial reality applications uses process authentication to ensure that, upon locking by a given software process, other software processes are not permitted to, deliberately or by mistake (e.g., due to a software bug or a hardware transient error), release or otherwise override the lock on the hardware mutex.

For instance, in one example approach, two or more artificial reality applications may share access to memory, pointers, values or other resources associated with the rendering of virtual table 124, with control of the shared resource(s) associated with shared table 124 handled through a hardware mutex 107. In accordance with the techniques described herein, when an artificial reality application that shares virtual table 124 attempts to release the lock of the hardware mutex associated with virtual table 124, the application may be required to authenticate itself to a control unit associated with mutexes 107 in the manners described below.

The system and techniques may provide one or more technical advantages that provide certain practical applications. For example, by enforcing process authentication with respect to hardware mutex 107, virtual reality system 10 ensures that only the software processes that can be authenticated are allowed to release the lock on a shared resource. Such an approach ensures stability in the use of a shared resource by preventing inadvertent or malicious release of the mutex lock associated with the shared resource. As one illustrative example, by preventing artificial reality applications that are concurrently running on a shared rendered scene from accessing resources associated with the scene when the scene is locked by another software process, users are provided with a stable multitasking environment with concurrently running artificial reality applications, unlike traditional artificial reality applications that require frequent switching (e.g., closing and restarting) between artificial reality applications on the HMD or may otherwise be at risk for accidental or intentional misuse of otherwise locked resources.

Figure 1B:
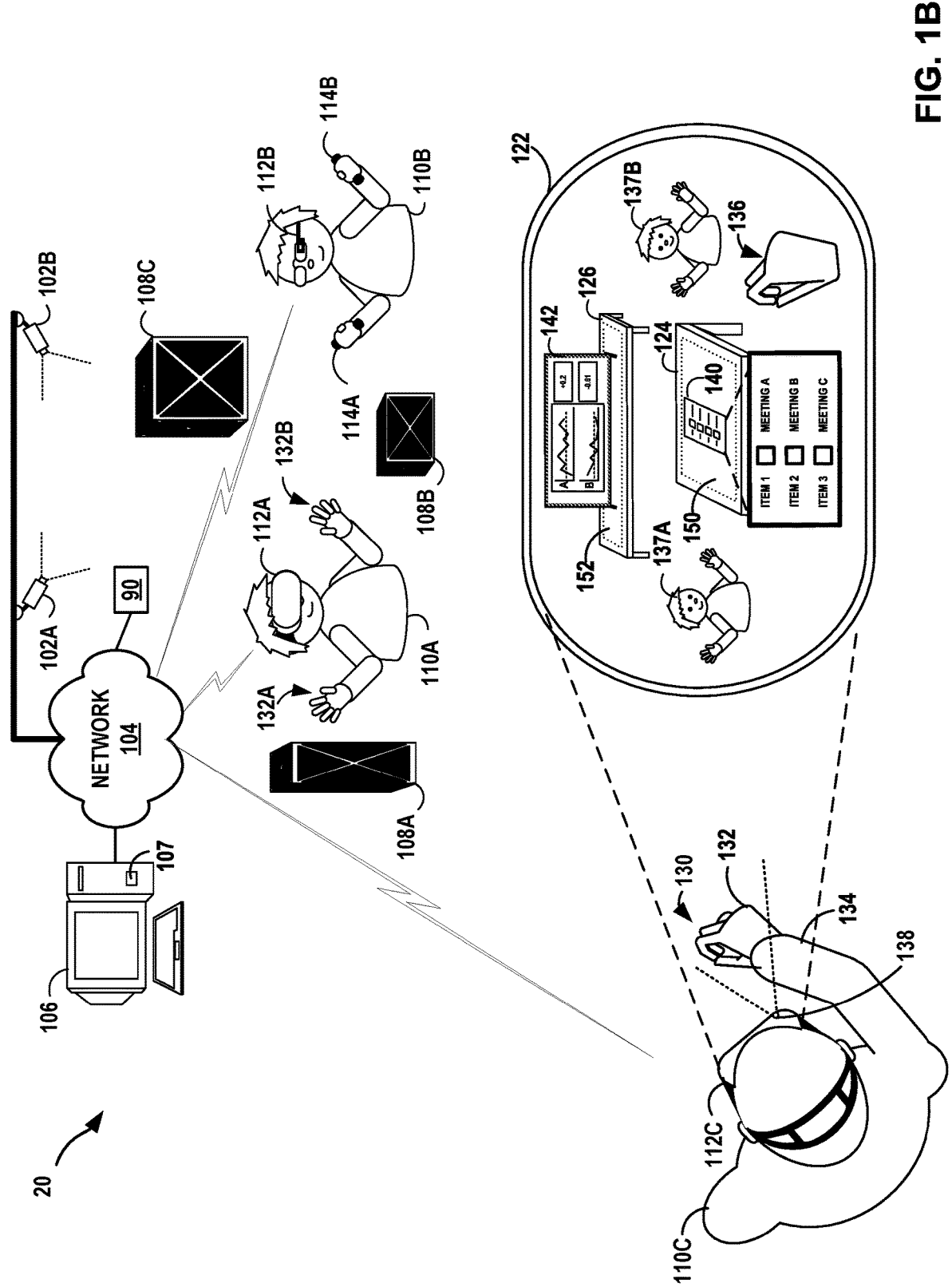
FIG. 1B is an illustration depicting another example artificial reality system having hardware-based mutexes that use process authentication in accordance with the techniques of the disclosure.

FIG. 1B is an illustration depicting another example artificial reality system having hardware-based mutexes that use process authentication in accordance with the techniques of the disclosure. Similar to artificial reality system 10 of FIG. 1A, in some examples, artificial reality system 20 of FIG. 1B may generate and render a common scene including objects for a plurality of artificial reality applications within a multi-user artificial reality environment. Artificial reality system 20 may also, in various examples, provide interactive placement and/or manipulation of virtual objects in response detection of one or more particular gestures of a user within the multi-user artificial reality environment.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which a plurality of artificial reality applications executing on console 106 and/or HMDs 112 are concurrently running and displayed on a common rendered scene presented to each of users 110A-110C (collectively, "users 110") based on a current viewing perspective of a corresponding frame of reference for the respective user. That is, in this example, each of the plurality of artificial reality applications constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the plurality of artificial reality applications may render on the same scene, based on a current viewing perspective determined for HMD 112C, artificial reality content 122 having virtual objects 124, 126, 140, and 142 as spatially overlaid upon real world objects 108A-108C (collectively, "real world objects 108"). Further, from the perspective of HMD 112C, artificial reality system 20 renders avatars 137A, 137B based upon the estimated positions for users 110A, 110B, respectively.

Each of HMDs 112 concurrently operates within artificial reality system 20. In the example of FIG. 1B, each of users 110 may be a "participant" (or "player") in the plurality of artificial reality applications, and any of users 110 may be a "spectator" or "observer" in the plurality of artificial reality applications. HMD 112C may operate substantially similar to HMD 112 of FIG. 1A by tracking hand 132 and/or arm 134 of user 110C, and rendering the portions of hand 132 that are within field of view 130 as virtual hand 136 within artificial reality content 122. HMD 112B may receive user inputs from controllers 114A held by user 110B. HMD 112A may also operate substantially similar to HMD 112 of FIG. 1A and receive user inputs by tracking movements of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using another type of communication links.

In a manner similar to the examples discussed above with respect to FIG. 1A, processors executing on one or more of console 106 and HMD 112C of artificial reality system 20 generate and render a scene in which multiple artificial reality applications are concurrently running and displayed on the scene. In particular, the processors are configured to aggregate and render a scene in which an agenda application and media content application are concurrently running and displayed on artificial reality content 122. In this example, the processors render a common scene that includes an agenda object 140 of an agenda application and a virtual media object 142 of a media content application presented to each of users 110. In this way, user 110C may share content of concurrently running artificial reality applications, such as files or media content, with one or more of users 110A and 110B. When sharing content, each of HMDs 112 may output the content, when executed, so that each of users 110 may experience the content together, even if the HMDs are in geographically different locations.

As shown in FIG. 1B, in addition to or alternatively to image data captured via camera 138 of HMD 112C, input data from external cameras 102 may be used to track and detect particular motions, configurations, positions, and/or orientations of hands and arms of users 110, such as hand 132 of user 110C, including movements of individual and/or combinations of digits (fingers, thumb) of the hand.

In some examples, as noted above with respect to FIG. 1A, two or more artificial reality applications run on console 106, and can utilize image capture devices 102A and 102B to analyze configurations, positions, and/or orientations of hand 132B to identify input gestures that may be performed by a user of HMD 112A. In some such examples, console 106 may employ process authentication on a set of hardware mutexes 107 to render virtual content items shared between software processes executing on console 106, responsive to such gestures, motions, and orientations, in a manner similar to that described above with respect to FIG. 1A. For example, console 106 may provide interactive placement and/or manipulation of agenda object 140 and/or virtual media object 142 responsive to such gestures, motions, and orientations, in a manner similar to that described above with respect to FIG. 1A. As additional illustrative examples, an HMD 112 may employ process authentication on hardware mutexes to render virtual content items shared between software processes executing on HMD 112, responsive to such gestures, motions, and orientations, in a manner similar to that described above with respect to FIG. 1A. For example, HMD 112 may provide interactive placement and/or manipulation of agenda object 140 and/or virtual media object 142 responsive to such gestures, motions, and orientations, in a manner similar to that described above with respect to FIG. 1A.

Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

As noted above with respect to FIG. 1A, and as further described in detail herein, artificial reality system 10 enforces process authentication in the hardware mutexes used to share resources in console 106 and/or HMD 112C, such that only software processes that can be authenticated are allowed to release the lock on a shared resource. Such an approach ensures stability in the use of a shared resource by preventing inadvertent or malicious release of the mutex lock associated with the shared resource.

Figure 2A:
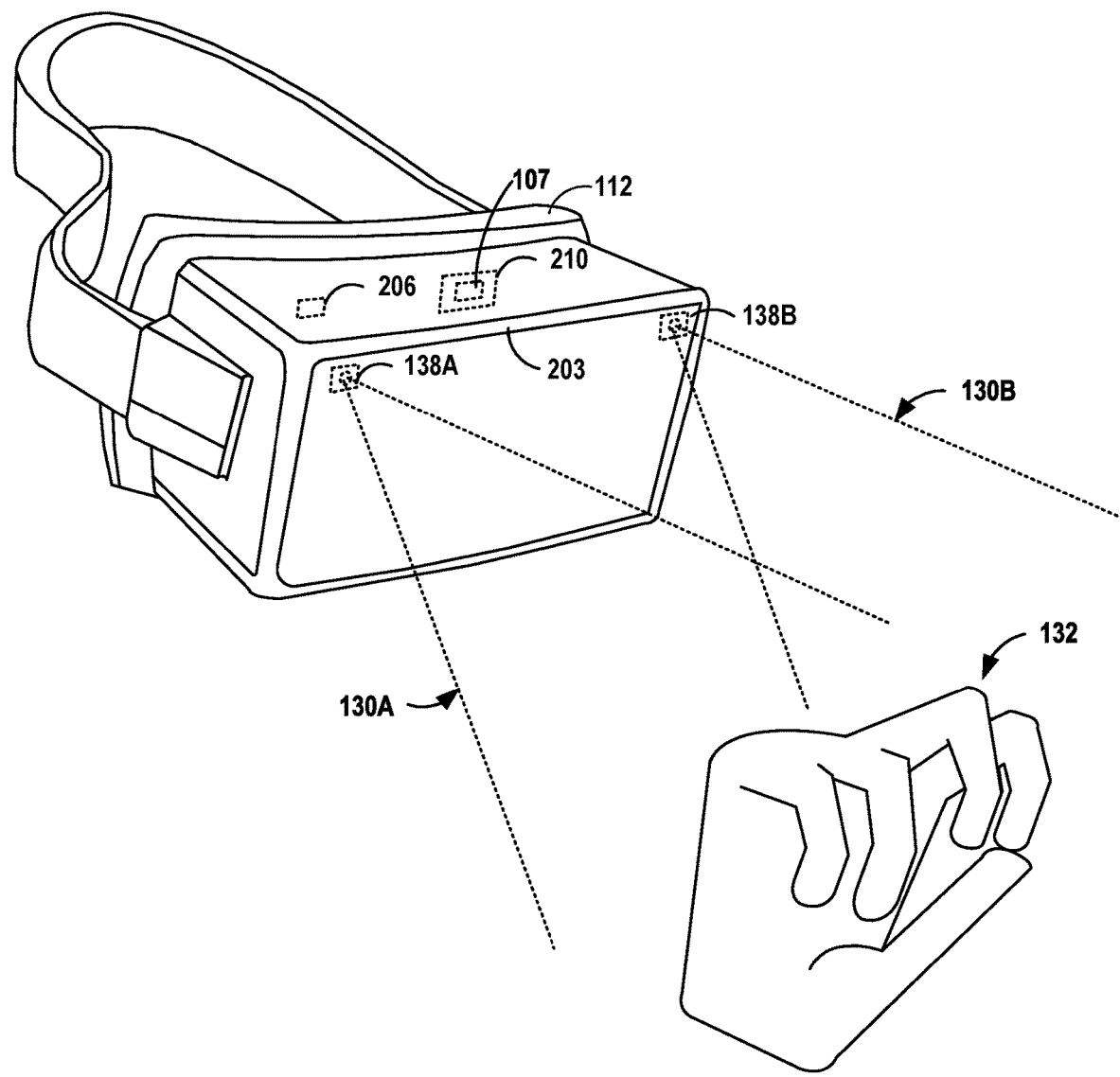
FIG. 2A is an illustration depicting an example HMD that operates in accordance with the techniques of the disclosure.

FIG. 2A is an illustration depicting an example HMD that operates in accordance with the techniques of the disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In accordance with the techniques described herein, control unit 210 enforces process authentication with respect to access and control of hardware mutexes 107, which are used to share resources in console HMD 112, such that only software processes that can be authenticated are allowed to release the lock on a shared resource.

Figure 2B:
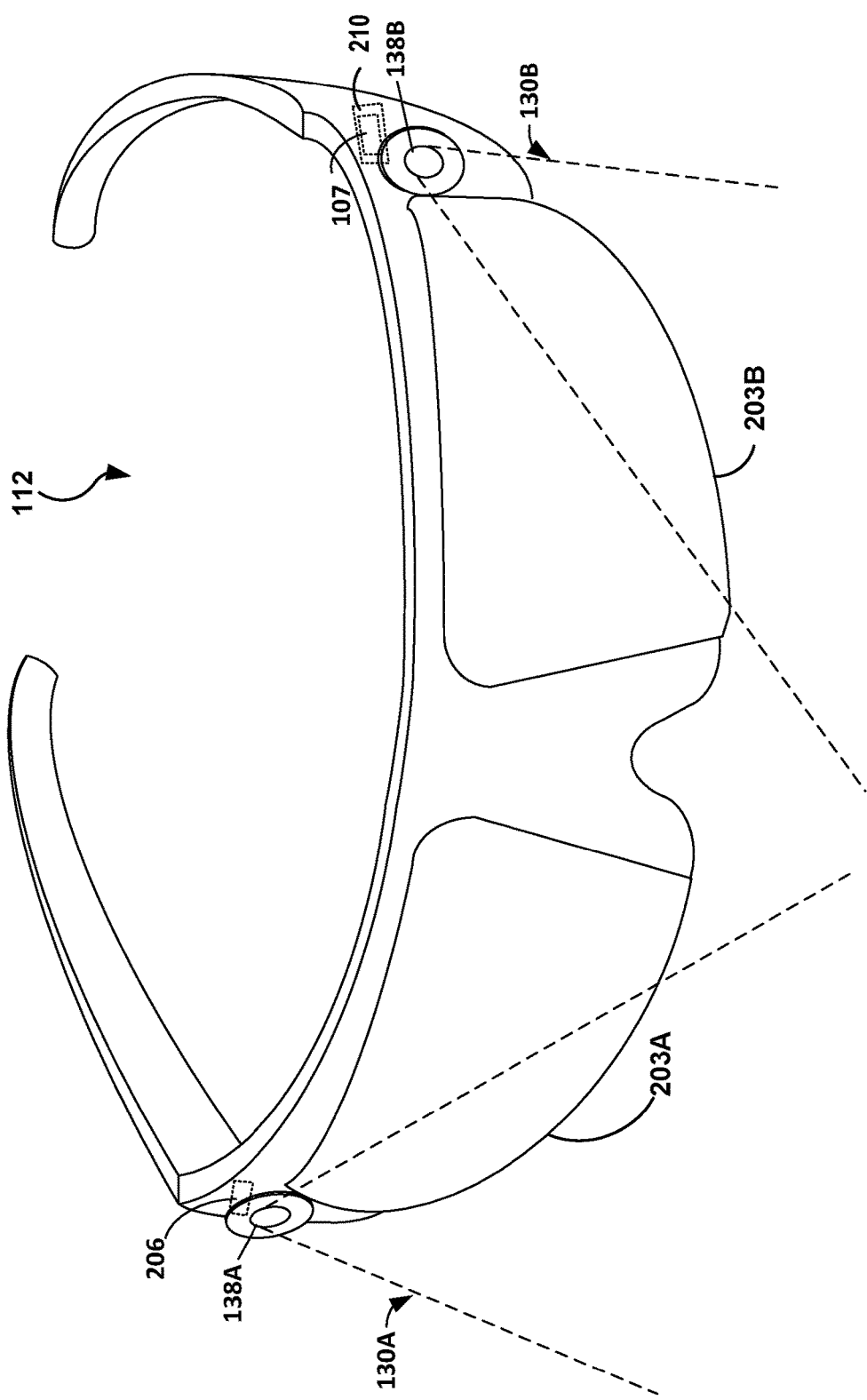
FIG. 2B is an illustration depicting another example HMD, in accordance with techniques described in this disclosure.

FIG. 2B is an illustration depicting another example HMD, in accordance with techniques described in this disclosure. As shown in FIG. 2B, HMD 112 may take the form of glasses. HMD 112 of FIG. 2B may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

Similar to the example illustrated in FIG. 2A, HMD 112 includes control unit 210 configured to, based on the sensed data (e.g., image data captured by image capture devices 138 and/or 102, position information from GPS sensors) and an aggregation of modeling information of virtual objects (e.g., virtual content items 124, 126, 140, 142 of FIGS. 1A and 1B) of a plurality of artificial reality applications, generate and render for display on display 203 the objects of a plurality of concurrently executing artificial reality applications. As explained with reference to FIGS. 1A, 1B and 2A, in this example, HMD 112 uses and enforces process authentication with respect to hardware mutexes 107 of control unit 210 to more stably share resources in console HMD 112, such that only software processes that can be authenticated are allowed to release a lock on a given shared resource. As one illustrative example, control unit 210 may enforce access to hardware mutex 107 across concurrently executing software processes that collaborate on generating artificial reality content, such as in the example of FIGS. 1A and 1B. As another illustrative example, the control unit 210 uses one or more hardware mutexes 107 to control interactions by artificial reality applications to the objects and/or resources associated with a given scene and delivers input and other signals to and from interested artificial reality applications.

Figure 3:
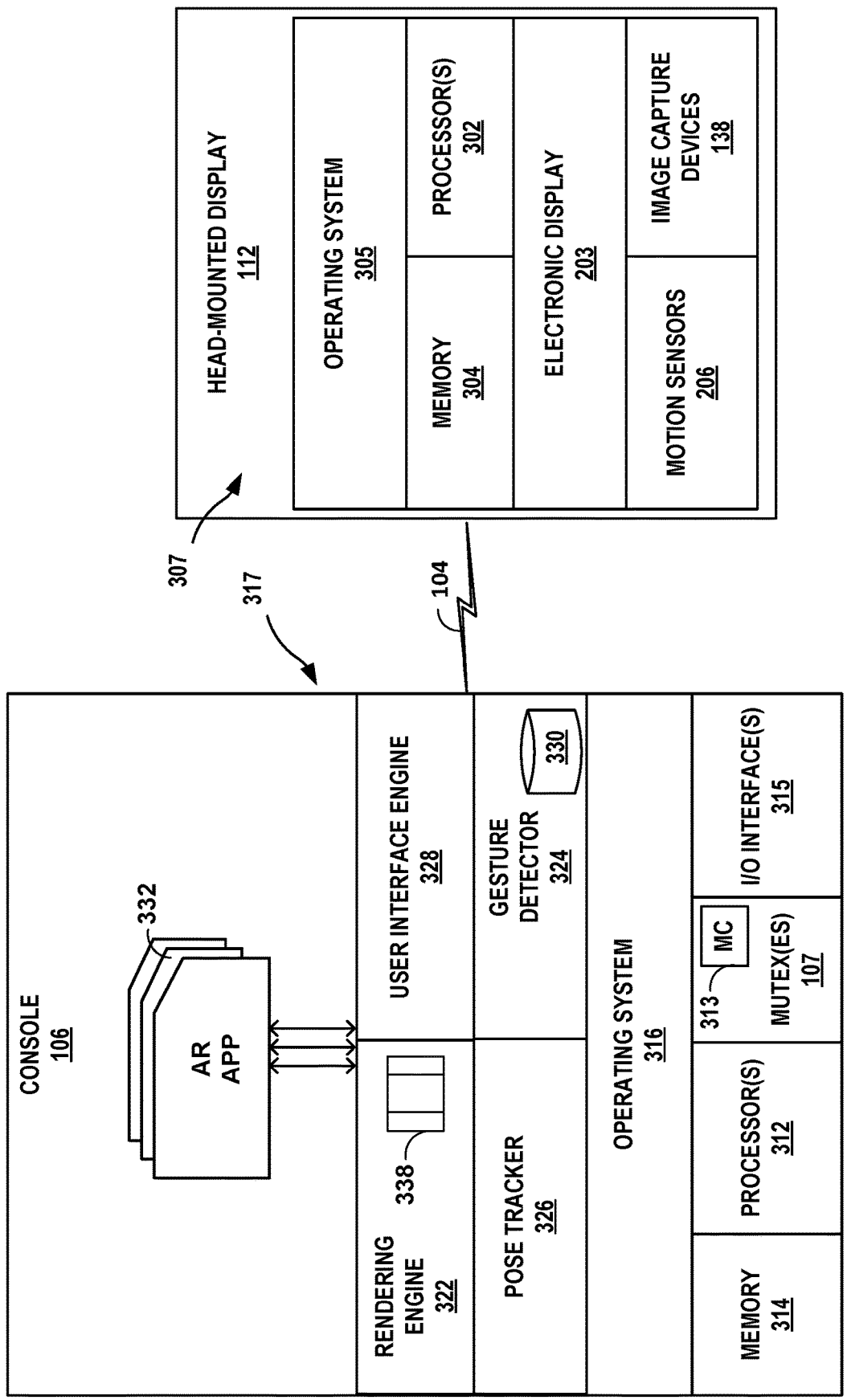
FIG. 3 is a block diagram showing example implementations of a console and an HMD of the artificial reality system having hardware-based mutexes that use process authentication when controlling access to shared resources by software processes, in accordance with the techniques of the disclosure.

FIG. 3 is a block diagram showing example implementations of a console and an HMD of the artificial reality system having hardware-based mutexes that use process authentication when controlling access to shared resources by software processes, in accordance with the techniques of the disclosure. In the example of FIG. 3, console 106 performs pose tracking, gesture detection, and generation and rendering of multiple artificial reality applications 332 concurrently running and outputting content for display within a common 3D AR scene on electronic display 203 of HMD 112.

In the example of FIG. 3, console 106 includes one or more processors 312, one or more hardware mutexes 107 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, and the like. Hardware mutexes 107 include a mutex controller 313 configured to perform process authentication on software processes executing on processors 312 before allowing the software processes to release a lock on a hardware mutex 107.

The one or more I/O interfaces 315 may include one or more wired or wireless network interface controllers (NICs) for communicating with a network, such as network 104. Each of processors 302, 312 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including concurrent application engine 107. As discussed with respect to the examples of FIGS. 2A and 2B, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or HMD 112 to perform gesture detection and user interface generation for HMD 112. In some examples, console 106 is a single computing device, such as a workstation, a desktop computer, a laptop, or gaming system. In some examples, at least a portion of console 106, such as processors 312, mutexes 107 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In one example, software applications 317 of console 106 operate to provide an aggregation of artificial reality applications on a common scene. In this example, software applications 317 include rendering engine 322, gesture detector 324, pose tracker 326, and user interface engine 328.

In general, rendering engine 322 includes functionality to provide and present an aggregation of content generated by a plurality of artificial reality applications 332, e.g., a teleconference application, a gaming application, a navigation application, an educational application, training or simulation applications, and the like. Rendering engine 322 may include, for example, one or more software packages, software libraries, hardware drivers, and/or Application Program Interfaces (APIs) for implementing an aggregation of a plurality of artificial reality applications 332 on console 106. In one example approach, rendering engine 322 aggregates modeling information of objects of the plurality of artificial reality applications 332 for rendering a common scene, where the common scene may present a 3D scene collaboratively constructed and controlled by the plurality of artificial reality applications 332. A hardware mutex 107 associated with each artificial reality application 332 signals rendering engine 322 that content for each respective artificial reality application 332 is ready.

In one example, rendering engine 322 constructs the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras 102, to capture 3D information within the real world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Based on the sensed data from any of the image capture devices (such as external cameras 102 or image capture devices 138), or other sensor devices, gesture detector 324 analyzes the tracked motions, configurations, positions, and/or orientations of HMD 112 and/or physical objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify a hand and/or arm of user 110, and track movements of the hand and/or arm relative to HMD 112 to identify gestures performed by user 110. Gesture detector 324 may track movement, including changes to position and orientation, of hand, digits, and/or arm based on the captured image data, and compare motion vectors of the objects to one or more entries in gesture library 330 to detect a gesture or combination of gestures performed by user 110.

Some entries in gesture library 330 may each define a gesture as a series or pattern of motion, such as a relative path or spatial translations and rotations of a user's hand, specific fingers, thumbs, wrists and/or arms. Some entries in gesture library 330 may each define a gesture as a configuration, position, and/or orientation of the user's hand and/or arms (or portions thereof) at a particular time, or over a period of time. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, in accordance with the techniques of this disclosure, certain specialized gestures may be pre-defined such that, in response to detecting one of the pre-defined gestures, console 106 may control interactions to the objects on the rendered scene, and delivers input and other signals for interested artificial reality applications.

As an example, gesture library 330 may include entries that describe a selection gesture, a translation gesture (e.g., moving, rotating), modification/altering gesture (e.g., scaling), or other gestures that may be performed by users. Gesture detector 324 may process image data from image capture devices 138 to analyze configurations, positions, motions, and/or orientations of a user's hand to identify a gesture, such as a selection gesture. For instance, gesture detector 324 may detect a particular configuration of the hand that represents the selection of an object, the configuration being the hand being positioned to grab the object placed on a first offer area. This grabbing position could be, in some instances, a two-finger pinch where two or more fingers of a user's hand move closer to each other, performed in proximity to the object. Gesture detector 324 may subsequently detect a translation gesture, where the user's hand or arm moves from a first offer area to another location of the first offer area or to a second offer area. Gesture detector may also detect a releasing gesture, where two or more fingers of a user's hand move further from each other. Once released, the object is connected to the second offer area.

In this example, consistent with the techniques described herein, mutex controller 313 enforces authentication of software processes 332 with respect to access to hardware mutexes 107 used to share resources in console 106. In the example shown in FIG. 3, console 106 uses the process authentication of hardware mutexes 107 to ensure that only software processes that can be authenticated are allowed to release the lock on a shared resource. Such an approach ensures stability in the use of a shared resource by preventing inadvertent or malicious release of the mutex lock associated with the shared resource.

Figure 4:
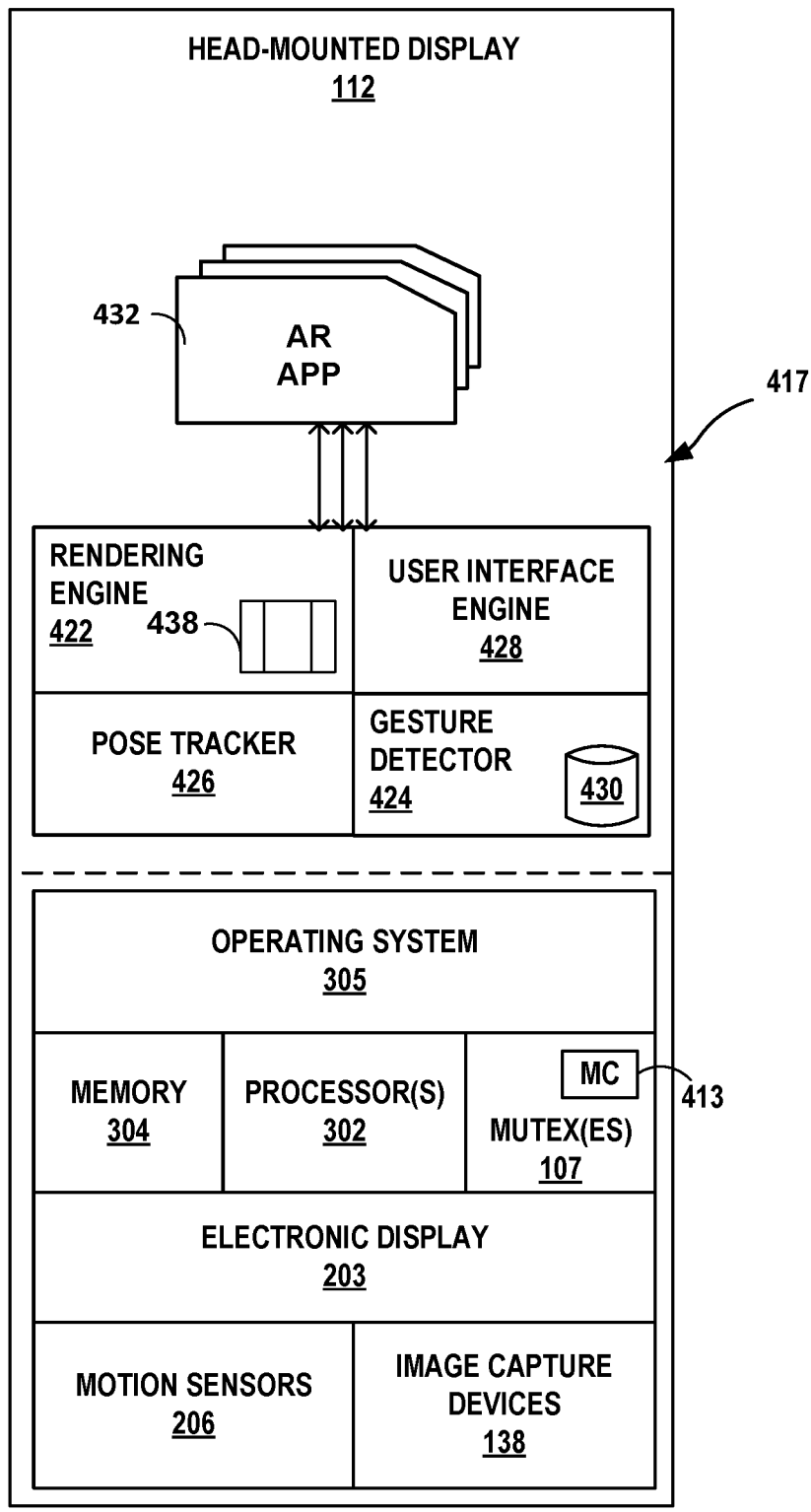
FIG. 4 is a block diagram depicting an example HMD of the artificial reality system having hardware-based mutexes that use process authentication when controlling access to shared resources by software processes, in accordance with the techniques of the disclosure.

FIG. 4 is a block diagram depicting an example HMD of the artificial reality system having hardware-based mutexes that use process authentication when controlling access to shared resources by software processes, in accordance with the techniques of the disclosure. Similar to FIG. 3, in this example, HMD 112 includes one or more processors 302, one or more hardware mutexes 107 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to generate and render multiple artificial reality applications concurrently, running and outputting content for display within a common 3D AR scene. In this example, software applications 417 include rendering engine 422, gesture detector 424, pose tracker 426, and user interface engine 428. In various examples, software components 417 operate similar to the counterpart components of console 106 of FIG. 3 (e.g., rendering engine 322, gesture detector 324, pose tracker 326, and user interface engine 328) to aggregate and render a scene in which a plurality of artificial reality applications are concurrently running and displayed on the scene. In some examples, rendering engine 422 constructs the 3D, artificial reality content which may be overlaid, at least in part, upon the real-world, physical environment of user 110.

Similar to the examples described with respect to FIG. 3, in the example illustrated in FIG. 4, rendering engine 422 includes functionality to provide and present an aggregation of content generated by a plurality of artificial reality applications 432. Rendering engine 422 may include, for example, one or more software packages, software libraries, hardware drivers, and/or Application Program Interfaces (APIs) for implementing an aggregation of a plurality of artificial reality applications 432 on console 106.

In one example approach, rendering engine 322 aggregates modeling information of objects of the plurality of artificial reality applications for rendering a common scene 438, where the common scene may present a 3D scene collaboratively constructed and controlled by the plurality of artificial reality applications 432. A hardware mutex 107 associated with each artificial reality application 432 signals rendering engine 422 that content for each respective artificial reality application 432 is ready.

In one example, rendering engine 322 constructs the artificial reality content for display to user 110 in accordance with current pose information for a frame of reference, typically a viewing perspective of HMD 112, as determined by pose tracker 426. Based on the current viewing perspective, rendering engine 422 constructs the 3D, artificial reality content which may in some cases be overlaid, at least in part, upon the real-world 3D environment of user 110. During this process, pose tracker 426 operates on sensed data received from HMD 112, such as movement information and user commands, and, in some examples, data from any external sensors 90 (FIGS. 1A, 1B), such as external cameras 102, to capture 3D information within the real world environment, such as motion by user 110 and/or feature tracking information with respect to user 110. Based on the sensed data, pose tracker 426 determines a current pose for the frame of reference of HMD 112 and, in accordance with the current pose, constructs the artificial reality content for communication, via the one or more I/O interfaces, to HMD 112 for display to user 110.

Similar to the examples described with respect to FIG. 3, processors 302 of HMD 112 of FIG. 4 may control interactions to the objects on the rendered scene and delivers input and other signals for interested artificial reality applications. For example, based on the sensed data, gesture detector 424 analyzes the tracked motions, configurations, positions, and/or orientations of objects (e.g., hands, arms, wrists, fingers, palms, thumbs) of the user to identify one or more gestures performed by user 110. Gesture detector 424 may track movement, including changes to position and orientation, of hand, digits, and/or arm based on the captured image data, and compare motion vectors of the objects to one or more entries in gesture library 430 to detect a gesture or combination of gestures performed by user 110. Gesture library 430 is similar to gesture library 330 of FIG. 3.

As in the example shown in FIG. 3, in the example shown in FIG. 4, mutex controller 413 of HMD 112 uses the process authentication for software processes 432 to control access to hardware mutexes 107 so as to ensure that only software processes that can be authenticated are allowed to release the lock on a shared resource. As noted above, such an approach ensures stability in the use of a shared resource by preventing inadvertent or malicious release of the mutex lock associated with the shared resource.

Figure 5:
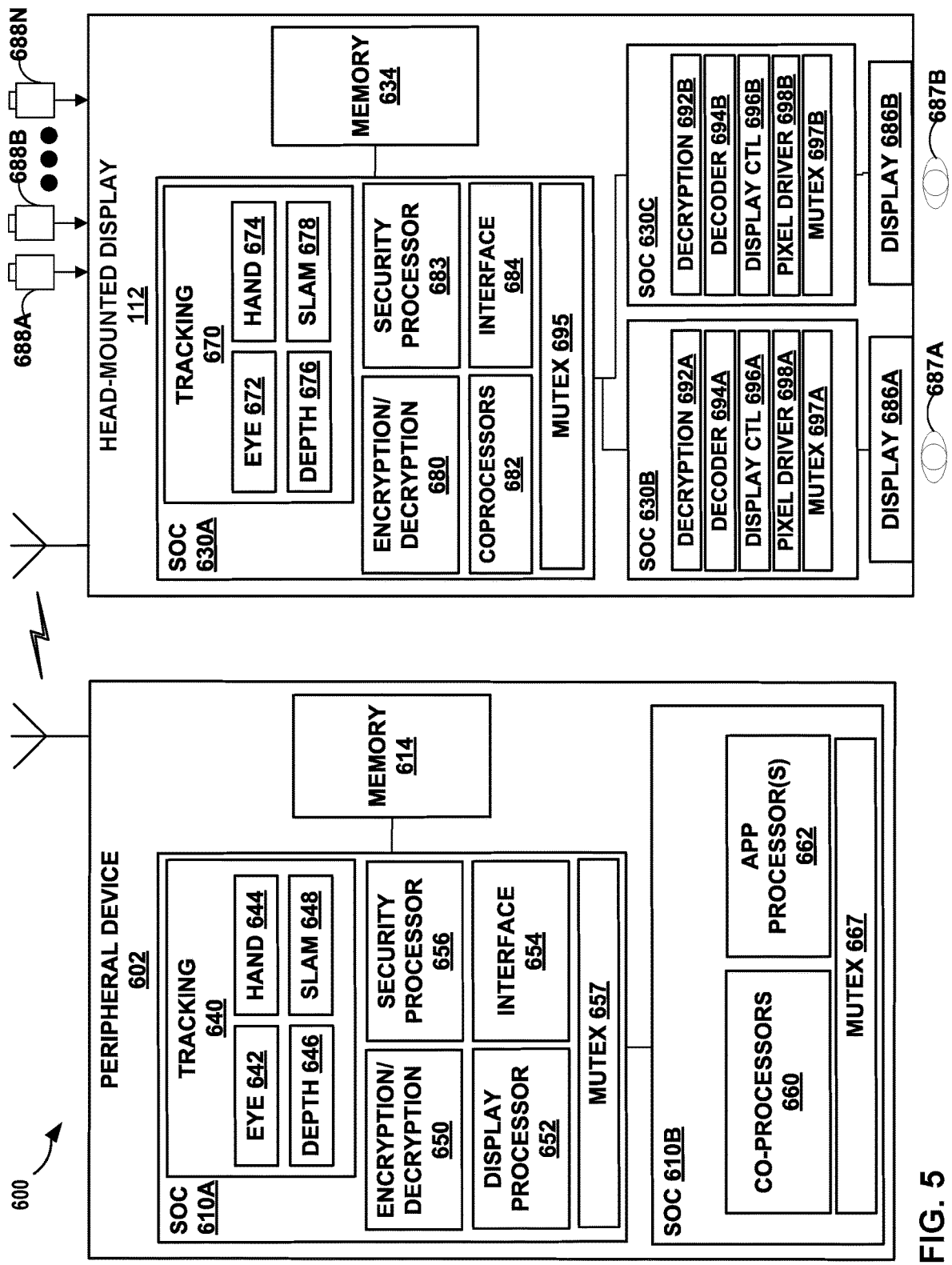
FIG. 5 is a block diagram illustrating a more detailed example implementation of a distributed architecture for a multi-device artificial reality system in which one or more devices are implemented using one or more System on a Chip (SoC) integrated circuits within each device, in accordance with the techniques of the disclosure.

FIG. 5 is a block diagram illustrating a more detailed example implementation of a distributed architecture for a multi-device artificial reality system in which one or more devices are implemented using one or more System on a Chip (SoC) integrated circuits within each device, in accordance with the techniques of the disclosure. In some examples, artificial reality system 600 includes a peripheral device 602 operating in conjunction with HMD 112. In this example, peripheral device 602 is a physical, real-world device having a surface on which the AR system overlays virtual content. Peripheral device 602 may include one or more presence-sensitive surfaces for detecting user inputs by detecting a presence of one or more objects (e.g., fingers, stylus) touching or hovering over locations of the presence-sensitive surface. In some examples, peripheral device 602 may include an output display, which may be a presence-sensitive display. In some examples, peripheral device 602 may be a smartphone, tablet computer, personal data assistant (PDA), or other hand-held device. In some examples, peripheral device 602 may be a smartwatch, smart ring, or other wearable device. Peripheral device 602 may also be part of a kiosk or other stationary or mobile system. Peripheral device 602 may or may not include a display device for outputting content to a screen.

As described, HMD 112 is architected and configured to enable concurrent execution of multiple artificial reality applications and collaborative scene rendering in accordance with techniques described in this disclosure. In general, the SoCs illustrated in FIG. 5 represent a collection of specialized integrated circuits arranged in a distributed architecture, where each SoC integrated circuit includes various specialized functional blocks configured to provide an operating environment for artificial reality applications. FIG. 5 is merely one example arrangement of SoC integrated circuits. The distributed architecture for a multi-device artificial reality system may include any collection and/or arrangement of SoC integrated circuits.

In this example, SoC 630A of HMD 112 comprises functional blocks including tracking 670, an encryption/decryption 680, co-processors 682, security processor 683, and an interface 684. In some examples SoC 630A includes a mutex 695 that performs process authentication when coordinating the sharing of resources within SoC 630A, or across AR system 600. For instance, in one example approach, one or more coprocessors 682 generates a common scene of an artificial reality environment that is collaboratively constructed and simultaneously controlled by the multiple artificial reality applications concurrently executing on one or more coprocessors 682. In one example, aspects of the common scene are handled as a shared resource, with hardware mutex 695 controlling access by the artificial reality applications to the shared resource via a locking mechanism protected by software process authentication. In one example approach, the hardware mutex 695 uses process authentication to ensure that other processes do not, deliberately or by mistake, release a lock on the hardware mutex.

In another example approach, a centralized scene controller executing on one of the coprocessors 682 aggregates the modeling information from each of the artificial reality applications, positions the respective objects within a common 3D scene, and renders the 3D visualization of the objects to the user such that the artificial reality applications are concurrently running and displayed on the common scene. In one such example approach, the centralized scene controller accesses hardware mutexes 695 used by each of the artificial reality applications to ensure that the data to be displayed reflects the latest information received from each of the artificial reality applications. The hardware mutexes 695 authenticate each process accessing the mutex to ensure that other processes do not, deliberately or by mistake, release a lock on one or more of the hardware mutexes.

Tracking 670 provides a functional block for eye tracking 672 ("eye 672"), hand tracking 674 ("hand 674"), depth tracking 676 ("depth 676"), and/or Simultaneous Localization and Mapping (SLAM) 678 ("SLAM 678"). For example, HMD 112 may receive input from one or more accelerometers (also referred to as inertial measurement units or "IMUS") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 688A-688N (collectively, "image capture devices 688"). Image capture devices may include video cameras, laser scanners, Doppler radar scanners, depth scanners, or the like, configured to output image data representative of the physical environment. More specifically, image capture devices capture image data representative of objects (including peripheral device 602 and/or hand) in the physical environment that are within a field of view of image capture devices, which typically corresponds with the viewing perspective of HMD 112. Based on the sensed data and/or image data, tracking 670 determines, for example, a current pose for the frame of reference of HMD 112 and, in accordance with the current pose, renders the artificial reality content.

Encryption/decryption 680 is a functional block to encrypt outgoing data communicated to peripheral device 602 or security server and decrypt incoming data communicated from peripheral device 602 or security server. Encryption/decryption 680 may support symmetric key cryptography to encrypt/decrypt data with a session key (e.g., secret symmetric key).

Co-application processors 682 include various processors such as a microprocessor, video processing unit, graphics processing unit, digital signal processors, encoders and/or decoders, and/or others. In accordance with the techniques described in this disclosure, all or portions of a backend shell may be in hardware, software, or a combination of hardware and software. For example, the backend shell of a concurrent application engine may be executed on co-application processors 682. A plurality of artificial reality applications may be concurrently executed on co-application processors 682.

Security processor 683 provides secure device attestation and mutual authentication of HMD 112 when pairing with devices, e.g., peripheral device 606, used in conjunction within the AR environment. Security processor 683 may authenticate SoCs 630A-630C of HMD 112.

In some example approaches, interface 684 is a functional block that includes one or more interfaces for connecting to functional blocks of SoC 630A. In one example, one or more of SoCs 630A-630C are connected through interface 684 to memory 634. In some examples, SoC 630A may connect with SoC 630B, 630C using interface 684. In addition, SoC 630A may connect with a communication device (e.g., radio transmitter) using interface 684 for communicating with other devices, e.g., peripheral device 602. As one example, interface 684 may include peripheral component interconnect express (PCIe) slots.

SoCs 630B and 630C each represents display controllers for outputting artificial reality content on respective displays, e.g., displays 686A, 686B (collectively, "displays 686"). In this example, SoC 630B may include a display controller 696A for display 668A to output artificial reality content for a left eye 687A of a user. In the example shown, SoC 630B includes a decryption block 692A, decoder block 694A, display controller 696A, and/or a pixel driver 698A for outputting artificial reality content on display 686A. Similarly, SoC 630C may include a display controller 696B for display 686B to output artificial reality content for a right eye 687B of the user. In the example shown, SoC 630C includes decryption 692B, decoder 694B, display controller 696B, and/or a pixel driver 698B for generating and outputting artificial reality content on display 686B. Displays 668 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content. In some examples SoCs 630B and 630C of HDM 112 also include mutexes 697A and 697B, respectively. Mutexes 697A and 697B are used to coordinate the sharing of resources within each SoC, or across AR system 600.

Peripheral device 602 includes SoCs 610A and 610B configured to support an artificial reality application. In this example, SoC 610A comprises functional blocks including tracking 640, an encryption/decryption 650, a display processor 652, an interface 654, and security processor 656. Tracking 640 is a functional block providing eye tracking 642 ("eye 642"), hand tracking 644 ("hand 644"), depth tracking 646 ("depth 646"), and/or Simultaneous Localization and Mapping (SLAM) 648 ("SLAM 648"). For example, peripheral device 602 may receive input from one or more accelerometers (also referred to as inertial measurement units or "IMUs") that output data indicative of current acceleration of peripheral device 602, GPS sensors that output data indicative of a location of peripheral device 602, radar or sonar that output data indicative of distances of peripheral device 602 from various objects, or other sensors that provide indications of a location or orientation of peripheral device 602 or other objects within a physical environment. Peripheral device 602 may in some examples also receive image data from one or more image capture devices, such as video cameras, laser scanners, Doppler radar scanners, depth scanners, or the like, configured to output image data representative of the physical environment. Based on the sensed data and/or image data, tracking block 640 determines, for example, a current pose for the frame of reference of peripheral device 602 and, in accordance with the current pose, renders the artificial reality content to HMD 112.

Encryption/decryption 650 encrypts outgoing data communicated to HMD 112 or security server and decrypts incoming data communicated from HMD 112 or security server. Encryption/decryption 550 may support symmetric key cryptography to encrypt/decrypt data using a session key (e.g., secret symmetric key).

Display processor 652 includes one or more processors such as a video processing unit, graphics processing unit, encoders and/or decoders, and/or others, for rendering artificial reality content to HMD 112.

Interface 654 includes one or more interfaces for connecting to functional blocks of SoC 510A. In one example, one or more of SoCs 610A-610C are connected through interface 654 to memory 614. SoC 610A may connect with one or more communication devices (e.g., radio transmitter) using interface 654 for communicating with other devices, e.g., HMD 112. As one example, interface 654 may include peripheral component interconnect express (PCIe) slots.

As discussed with respect to the example of FIG. 5, security processor 656 provides secure device attestation and mutual authentication of peripheral device 602 when pairing with devices, e.g., HMD 112, used in conjunction within the AR environment. Security processor 656 may also authenticate SoCs 610A, 610B of peripheral device 602.

SoC 610B includes co-application processors 660 and application processors 662. In this example, co-application processors 660 includes various processors, such as a vision processing unit (VPU), a graphics processing unit (GPU), and/or central processing unit (CPU). Application processors 662 may include a processing unit for executing one or more artificial reality applications to generate and render, for example, a virtual user interface to a surface of peripheral device 602 and/or to detect gestures performed by a user with respect to peripheral device 602.

In some examples SoCs 610A and 610B of peripheral device 602 also include mutexes 657 and 667, respectively, within each respective integrated circuit. As in the examples discussed with respect to FIGS. 1A, 1B, 2A, 2B, 3 and 4, mutexes 657 and 667 may be used to coordinate the sharing of resources within each SoC, or across AR system 600 by ensuring that only authenticated software processes can release a lock on mutexes 657 and 667.

By enforcing process authentication via the hardware mutexes 657, 667, 695 686A and 686B, virtual reality system 600 ensures that only the software processes (executing on the processing cores) that can be authenticated are allowed to release the lock on a shared resource. Such an approach ensures stability in the use of a shared resource by preventing inadvertent or malicious release of the mutex lock associated with the shared resource. By preventing artificial reality applications that are concurrently running on a shared rendered scene from accessing resources associated with the scene when the scene locked by another software process, users are provided with a stable multitasking environment capable of hosting concurrently running artificial reality applications, resulting in a much more flexible and expressive environment on HMD 112.

Figure 6:
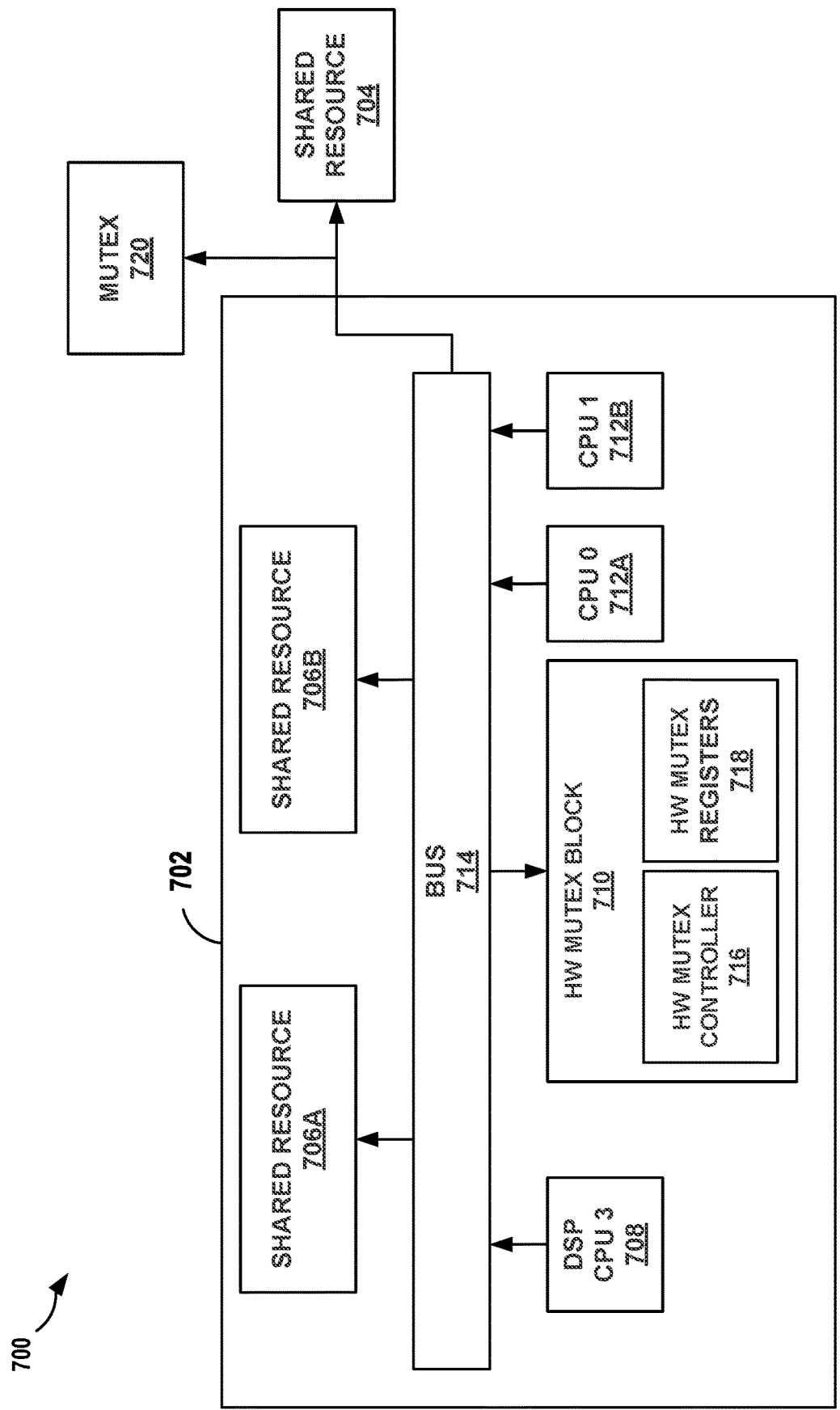
FIG. 6 is a block diagram illustrating the sharing of resources in an artificial reality system having hardware-based mutexes that use process authentication to limit simultaneous access to selected resources by software processes, in accordance with the techniques of the disclosure.

FIG. 6 is a block diagram illustrating the sharing of resources in an artificial reality system having hardware-based mutexes that use process authentication to limit simultaneous access to selected resources by software processes, in accordance with the techniques of the disclosure. In the example illustrated in FIG. 6, artificial reality system 700 includes an SoC 702 connected to a mutex 720 and a shared resource 704. SoC 702 includes shared resources 706A and 706B, coprocessor 708, mutex 710, processors 712A and 712B (together "processors 712") and bus 714. In the example shown, coprocessor 708 and processors 712A and 712B communicate with mutex 710 and shared resources 704, 706A and 706B via bus 714. In some examples, processors 712 employ a hardware instruction set architecture based on reduced instruction set computer (RISC) principles. In some such examples, processors 712 employ a RISC-V architecture, an open-source hardware instruction set architecture based on RISC. In other examples, processors 712 employ a hardware instruction set architecture based on complex instruction set computer (CISC) principles.

Mutex 720 protects access to shared resources both within and outside of SoC 702. In one example approach, mutex 710 is a hardware mutex that protects access to shared resources both within and outside of SoC 702. In one example, mutex 710 includes a mutex controller 716 and one or more mutex registers 718; mutex 720 also includes a mutex controller and one or more mutex registers. SoC 702 may represent any of the SoC described in this disclosure for an AR system, another SoC, or another hardware architecture in which multiple software processes compete for shared resources.

As noted above, software processes sometimes require access to a shared section of memory or to a shared resource. In the examples discussed above with respect to FIGS. 1A, 1B, 2A, 2B, and 3-5, in an artificial reality system, one may have multiple artificial reality applications all trying to generate information to be displayed on an HMD 112 as artificial reality content 122. Hardware and software mutexes may be used to limit or prevent simultaneous access by processes to the same resource. Software mutexes are program objects created so that multiple threads or processes can share the same resource. Hardware mutexes are hardware blocks that implement a similar locking mechanism using a mutex controller and one or more mutex registers. In one example approach, hardware mutex controller 716 intercepts reads and writes to the hardware mutex registers 718 and enforces the register locking mechanism of the mutexes associated with the respective mutex registers 718. In some examples, software and hardware mutex registers exist outside of a central processing unit, are assigned addresses in an address space and are accessed via the assigned addresses. Hardware mutex registers may be, for example, accessible through the bus 714 in the same way as memory blocks such as RAM/ROM.

In the example shown in FIG. 6, mutexes 710 and 720 are used to control access to Shared Resources 704, 706A and 706B. When programs executing on processors 712A and 712B and coprocessors 708 want to access a shared resource, they access the mutex that is assigned to that particular shared resource before accessing the resource and release the mutex when done with the shared resource. As noted above, a mutex such as mutex 710 and mutex 720 may be used to synchronize access to a critical section/resource between different applications running on the same or different coprocessors or processors.

Figure 7:
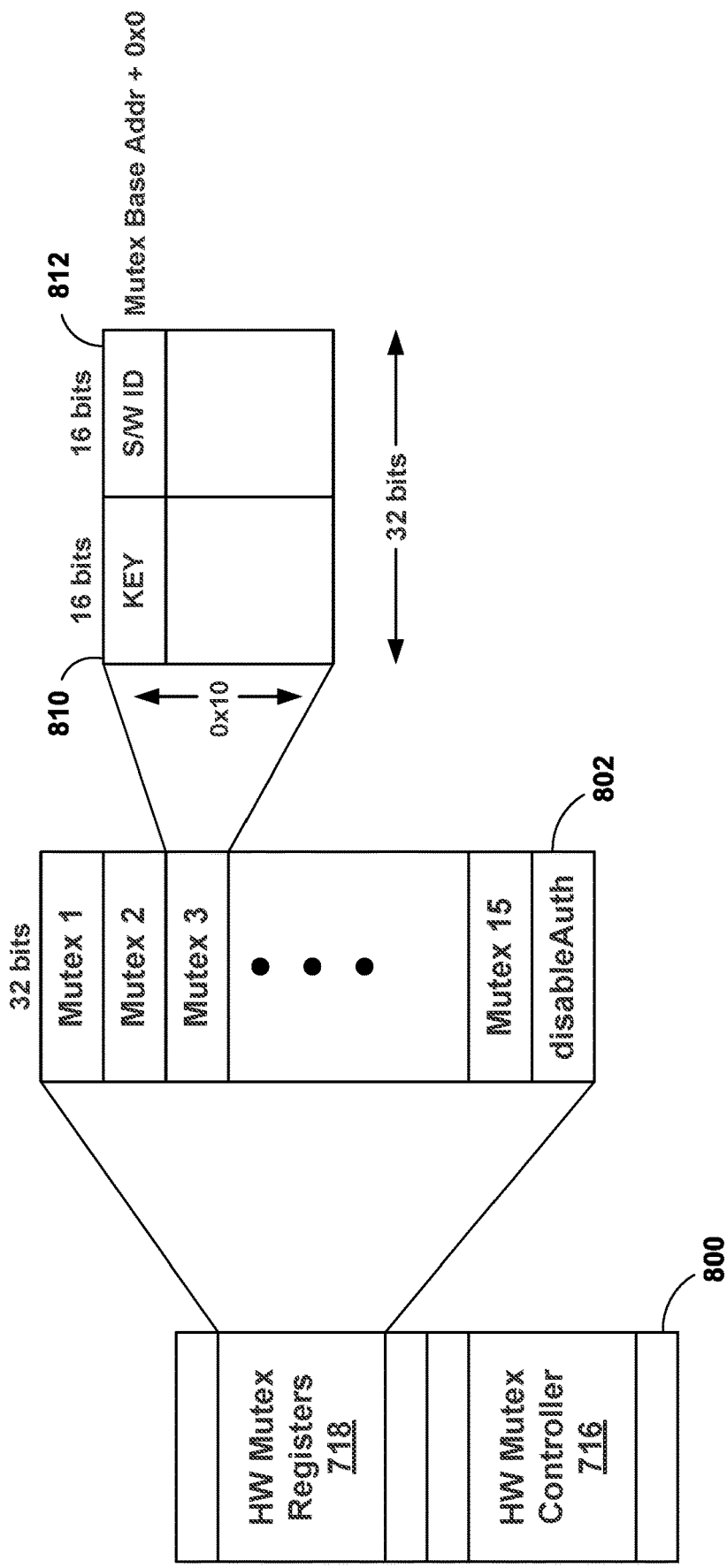
FIG. 7 is a block diagram illustrating an example hardware mutex, in accordance with the techniques of the disclosure.

FIG. 7 is a block diagram illustrating an example hardware mutex, in accordance with the techniques of the disclosure. When processes executing on processors 712A and 712B and/or coprocessors 708 want to access a shared resource, the processors and/or coprocessors access the mutex 710 that is assigned to that particular shared resource, acquiring (or "locking") the mutex, before accessing the resource. The processors and/or coprocessors then release the mutex when done with the Shared Resource.

As noted above in the discussion of FIG. 1A, existing mutexes have locking mechanisms that are easily released by any application simply by writing a value such as zero to the mutex. Because of this, even if an application acquires a lock on the resource, the lock may be cleared, deliberately or by mistake, by a second application. In contrast to existing mutexes, however, the mutexes 710 and 720 of FIG. 7 can only be released by an authenticated software process that has permission to release the lock. In one example approach, only the software process that acquired the lock can release the lock and that software process must be authenticated before the process can release the lock. In one example approach, the software process is authenticated when it supplies the correct key, as will be described in further detail below. Write and read requests described herein may be corresponding memory access requests addressing a memory location of a mutex.

In the example shown in FIG. 7, mutex block 800 includes a mutex controller 716 and one or more mutex registers 718. In one example approach, mutex block 800 has N number of mutexes capable of controlling access to N different shared resources. In the example shown in FIG. 7, the mutex registers 718 include fifteen mutex registers (Mutex 1-Mutex 15); Mutex Controller 716 intercepts reads and writes to the register 718 associated with Mutex 1 through Mutex 15 and enforces the register locking mechanism, as described below with respect to FIGS. 8-10. Once locked, each mutex can only be unlocked by the process that locked the mutex and that has the correct key (or other such form of authentication). In one example approach, each of the 15 mutexes may be used individually to guard shared resources. In one example approach, each application is assigned a key. The application gains access to a shared resource by writing the key into a key field 810 of the appropriate mutex register 718 at the time the mutex is locked. In one approach, a 16-bit key is associated with each lock and only the software element that acquired the lock knows the key and can release the mutex based on that key. In some approaches, the key may be 32 bits or more.

In one example approach, processing circuitry receives a request from a software process to release a lock on a mutex. The request includes a key, wherein the key is associated with the software process. The processing circuitry reads a value stored in a key field of one of one or more hardware registers of the mutex and, if the value matches the key, releases the lock on the mutex. In one example, the key of the request does not match the value in the key field when the software process is a trusted application that mistakenly attempts to release the lock of another software process. In another example, the key of the request does not match the value in the key field when the software process is a malicious or unsecured application that deliberately attempts to release the lock of another software process.

The level of security used depends on the design. For instance, one may require that a process authenticate itself to mutex controller 806 before the application is allowed to release the lock. The authentication may be at the level of matching a key, or it may extend to other forms of authentication. Such a design is a tradeoff between area overhead, software overhead and security level. In one example approach, a process identifier identifying the process acquiring the mutex is stored in application identifier field 812 of the appropriate mutex register 718 at the time the mutex is locked.

In one example approach, the following elements of mutex block 800 are configurable: Start address of mutex block 800. (Default value: 0x20000000); Size of the HW Mutex register space (Default value: 0x10); Number of mutexes (Default value: 15); and Disable Auth register (Default Value=0 indicates not disabled). In the example shown in FIG. 7, the default values are marked with an asterisk (*).

Although each hardware mutex shown in FIG. 7 is of size 0x10, in the example shown only one of the addresses is used to hold both the Software ID and the key. In one example approach, the size of key/ID is configurable since a 16-bit key may be vulnerable to brute force attacks and thus present a security flaw.

In one example approach, mutex registers 718 of mutex block 800 also includes a disableAuth register 802 used to disable key check while acquiring or releasing a mutex. Register 802 may be used by a process to acquire or release the mutex although it is currently being held by a different process.

Figure 8:
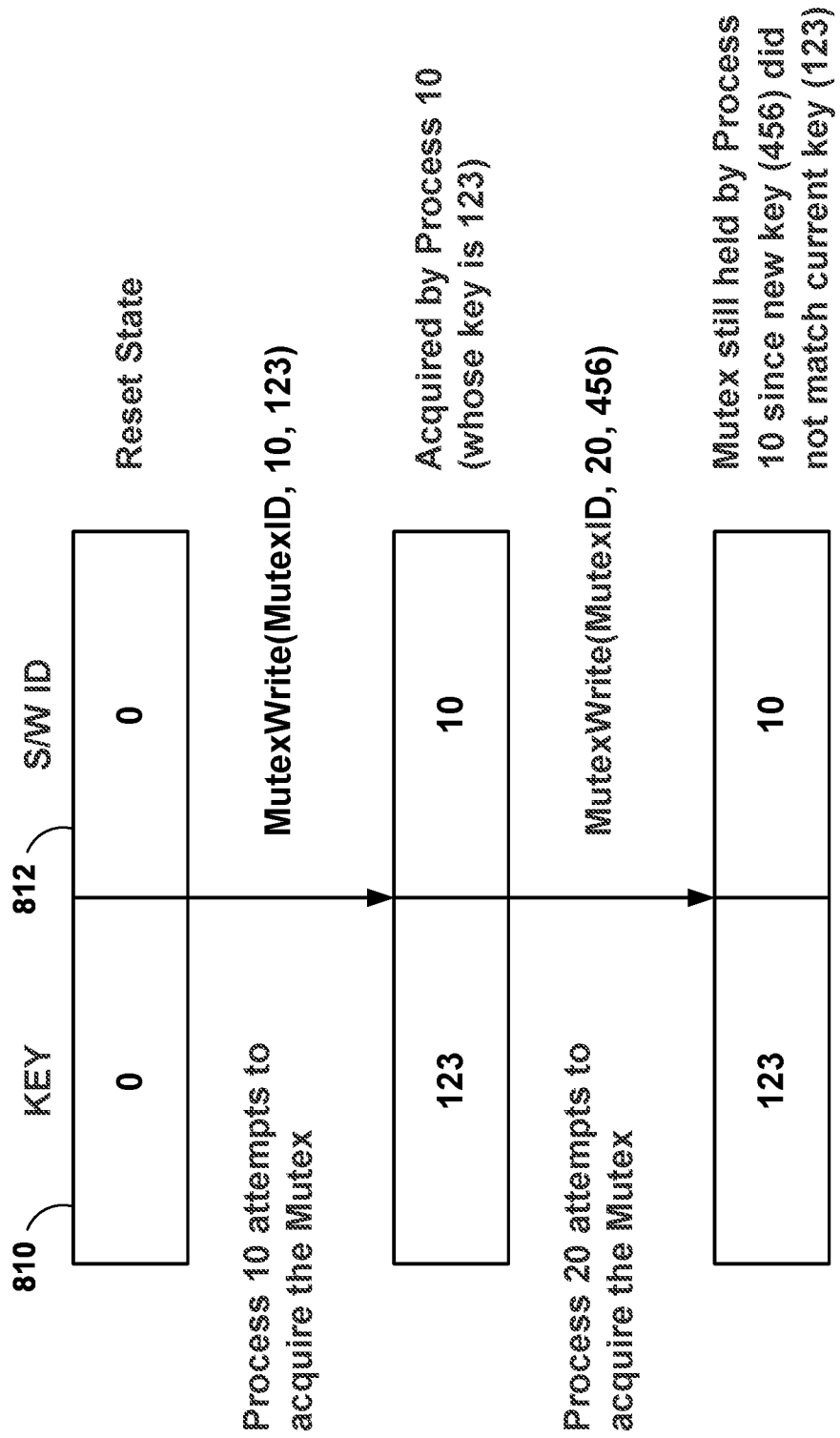
FIG. 8 is a block diagram illustrating an example mutex acquire operation in the mutex of FIG. 7, in accordance with the techniques of the disclosure.

FIG. 8 is a block diagram illustrating an example mutex acquire operation in the mutex of FIG. 7, in accordance with the techniques of the disclosure. In the examples shown in FIGS. 8-10, each mutex of mutex block 800 includes three mutex operations: Mutex Acquire, Mutex Read and Mutex Release. For simplicity, all diagrams show only the currently used address space of the mutex–Mutex base address+0x0.

The Mutex Acquire flow is detailed in FIG. 8. The mutex is initially in the reset state (no software process holds the mutex). A process with software ID 10 ("Process 10" in FIG. 8) attempts to acquire the Mutex by writing to the mutex's (Base Addr+0) register. Since the key contained in the mutex is 0, indicating reset, the mutex register is updated with the key of process 10 (123) in the upper 16 bits and the S/W Process ID (10) in the lower 16 bits, indicating that the mutex is now held by Process 10.

At this point, if another process ("Process 20" in FIG. 8) attempts to write to the mutex's register/acquire the mutex, its key (456) would be used to compare against the currently held key (123). Since the keys do not match, the mutex register is not updated.

If the disableAuth register 802 is set, then only the S/W ID is checked, and the key is ignored. Given the above scenario, Process 20 would fail to acquire the mutex because it's S/W ID does not match the value (10) currently held by the mutex.

Other authentication methods may be used. For instance, mutex controller 716 may receive, in the MutexAcquire request, a key that both identifies and authenticates the process making the request. That key is then store in a field in the mutex register associated with the mutex.

Figure 9:
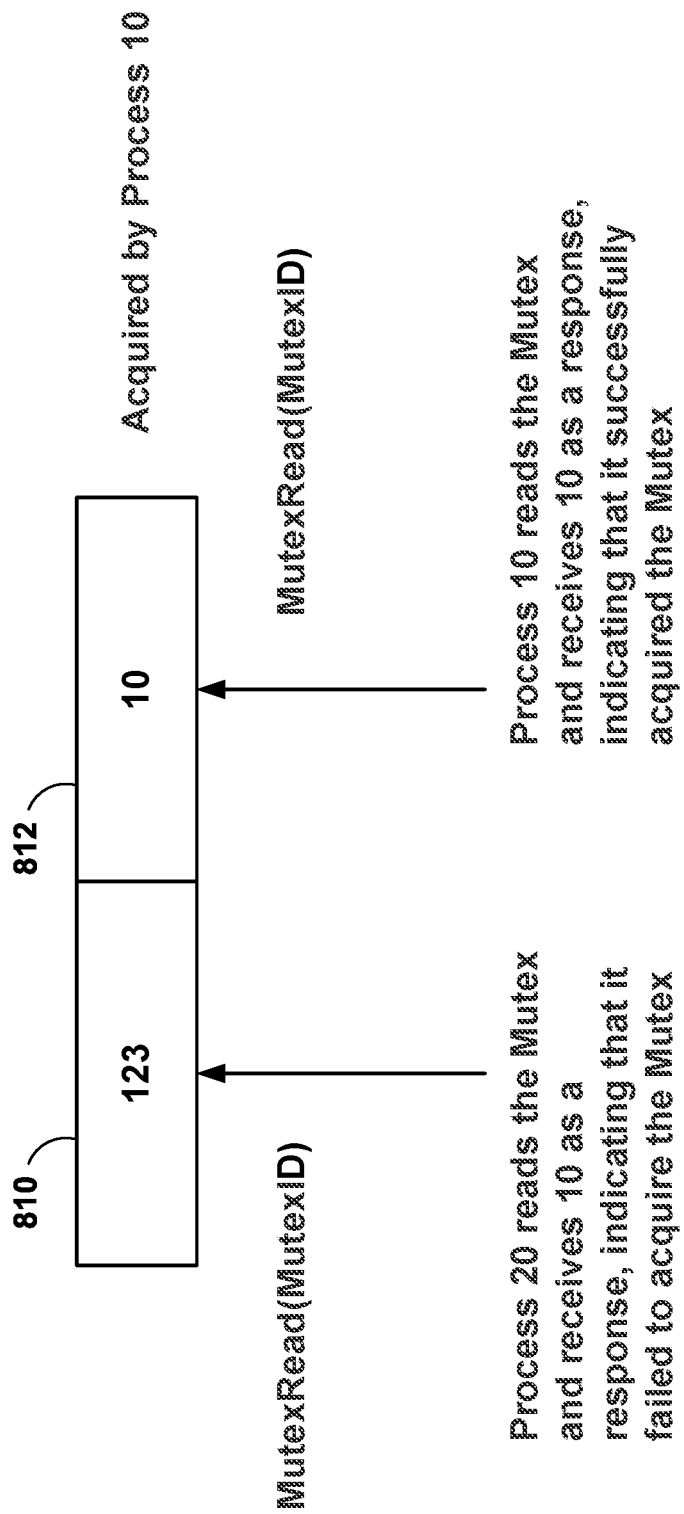
FIG. 9 is a block diagram illustrating an example mutex read operation in the mutex of FIG. 7, in accordance with the techniques of the disclosure.

FIG. 9 is a block diagram illustrating an example mutex read operation in the mutex of FIG. 7, in accordance with the techniques of the disclosure. In the example approach of FIG. 9, a process can check which process holds the Mutex by performing a Mutex Read operation. The MutexRead operation does not return the process key or returns a value in the key field that is not used as a process key (e.g., "0").

In some such example approaches, each process that did performs a MutexAcquire follows the MutexAcquire with a MutexRead in order to verify that the respective process has in fact acquired the Mutex. If a process performed a Mutex Acquire operation and a MutexRead does not return the process identifier of the respective processor, some other process has obtained the mutex and the process should not attempt to access the resource.

Figure 10:
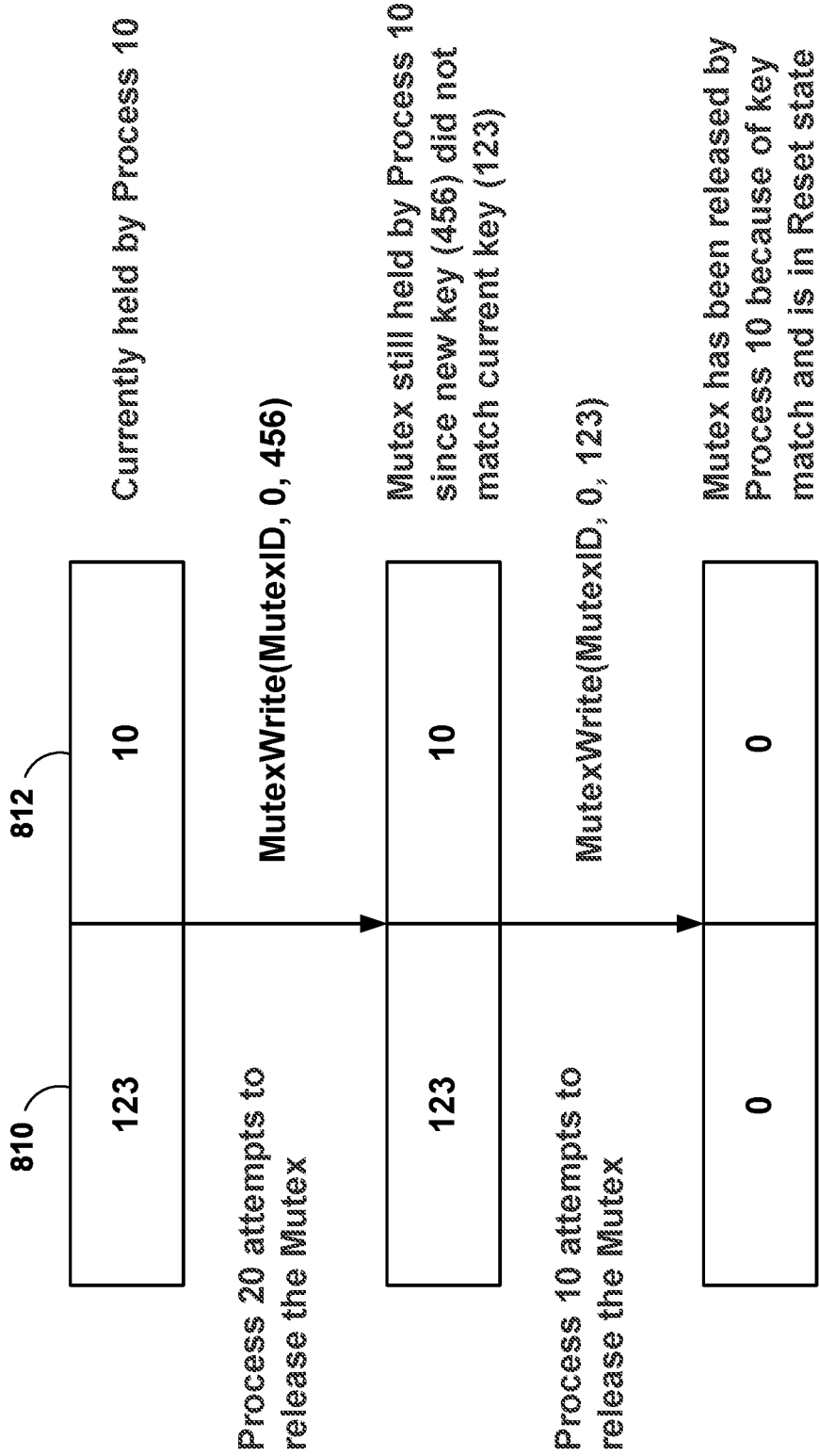
FIG. 10 is a block diagram illustrating an example mutex release operation in the mutex of FIG. 7, in accordance with the techniques of the disclosure.

FIG. 10 is a block diagram illustrating an example mutex release operation in the mutex of FIG. 7, in accordance with the techniques of the disclosure. The Mutex Release flow is detailed in the FIG. 10. A mutex is released by attempting to write a value of 0 to the mutex. Mutex controller 716 only allows this if the key passed in the request to release the mutex matches the key currently held in the mutex. In the diagram below, the mutex is held by Process 10. When Process 20 attempts to release the mutex, the release attempt fails because the key supplied by Process 20 (456) does not match the key (123) held by the mutex.

If the disableAuth register 802 is set, then the key is ignored. If Process 20 (or any other process) sends a write command—MutexWrite(MutexID, 0, 456) it can release the mutex that is currently held by process 10 when key matching has been disabled.

What has been described is a hardware mutex that uses process authentication to prevent a process from deliberately or mistakenly unlocking access to resources locked by other processes by releasing mutexes not acquired by the process. In one method, as described above, each process is associated with a key. When a process locks a mutex, the process writes its associated key and its process identifier (S/W ID) to a mutex register for the mutex. Attempts by processes to lock the already locked mutex deliberately or by mistake will fail because the key stored in the locked mutex register will not match the key of the process attempting to acquire the mutex. Consequently, a malicious or misbehaving process is unable to release the mutex and thereby cause contention between two or more other processes that use a resource protected by the mutex.

In some examples, the hardware mutex is a logic block of a System-on-Chip (SoC). The logic block includes a number of mutexes, implemented using registers, and mutex control logic used to lock and unlock each mutex by writing process identifiers and process-associated keys to the registers. In some examples, the hardware mutex is a logic block outside of but connected to the SOC.

As noted above, in one example approach, a 16-bit key is used to authenticate a process, but other length keys (such as 32 or 48 bits) may be used as needed to make it more difficult for a malicious process to brute force guess the key of another process. A key may be assigned to each process, or each process may generate or otherwise obtain (e.g., via a random number generator, from an administrator or from a third party) a value to be used as the process key. Other, more robust, forms of authentication may be used as well.

In one example approach, processes acquire access to a shared resource by writing a key to a key field 810 and a process identifier to an application identifier field 812 of the mutex register of the mutex associated with the shared resource. In another example approach, the mutex controller writes the key to key field 810 and the process identifier to the application identifier field 812 of the mutex register of the mutex. In some example approaches, the mutex controller obtains the key from the mutex lock request. In other example approaches, the mutex controller obtains the key from a memory location associated with the process. Processes verify acquisition of the mutex by reading the process identifier stored in the locked mutex register. If a process identifier matches the verifying process's associated identifier, the process has successfully acquired the mutex. The process may then access the resource or resources assigned to the register.

Figure 11:
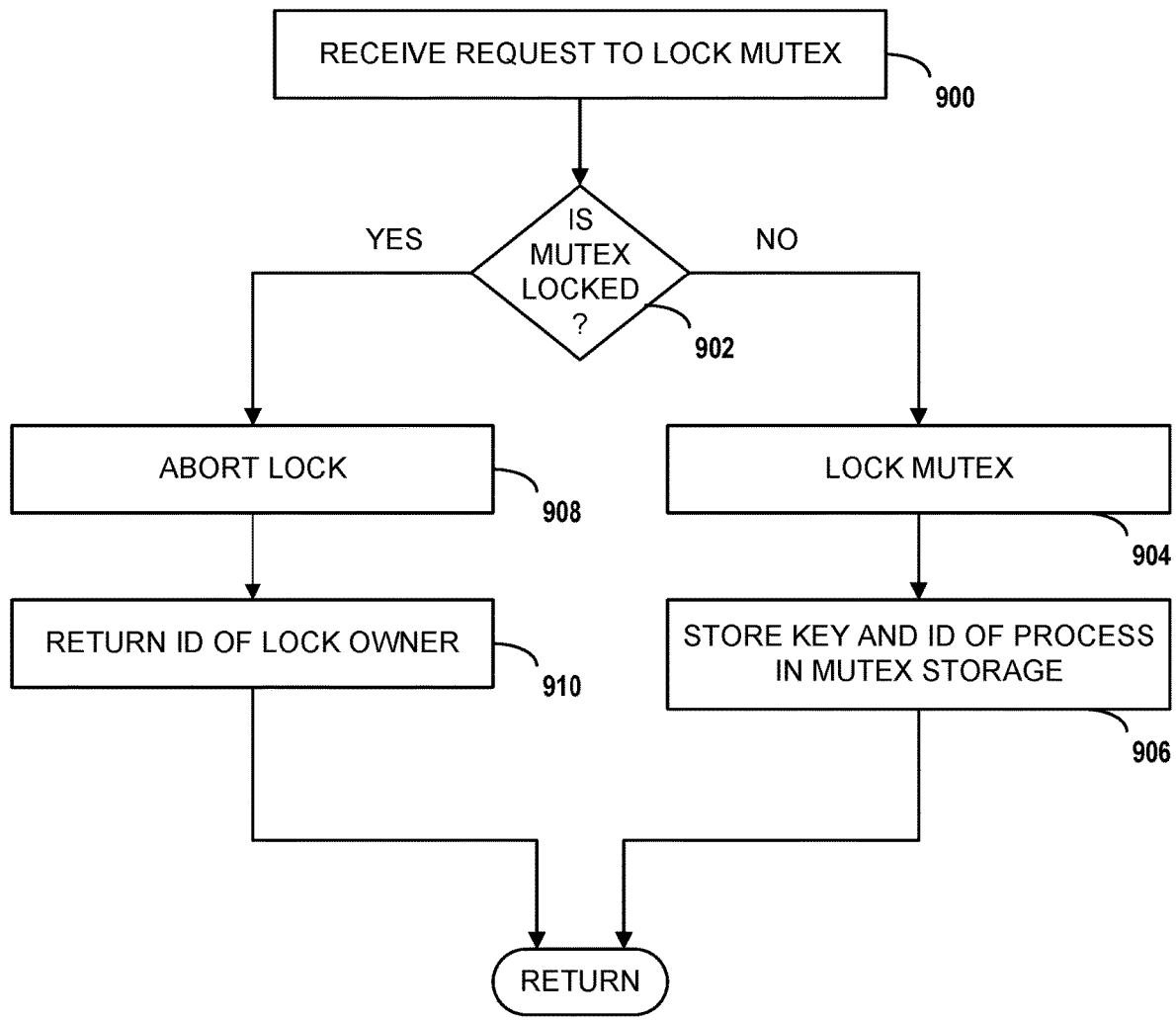
FIG. 11 is a flowchart illustrating an example mutex acquire operation in the mutex of FIG. 7, in accordance with the techniques of the disclosure.

FIG. 11 is a flowchart illustrating an example mutex acquire operation in the mutex of FIG. 7, in accordance with the techniques of the disclosure. As noted above in the discussion of FIG. 8, a mutex is initially in the reset state (no software process holds the mutex). A process with software ID 10 ("Process 10" in FIG. 8) attempts to acquire the Mutex by, for example, posting a request to lock the mutex (900). In some such approaches, this is done by writing to the mutex's (Base Addr+0) register. A check is made to determine if the mutex is locked (key from key field=0) (902). If the mutex is not locked, lock the mutex (904). In one example approach, as is shown in FIG. 8, update the mutex register with the key of process 10 (123) in the upper 16 bits and the S/W Process ID (10) in the lower 16 bits, indicating that the mutex is now held by Process 10 (906).

If, however, the check at (902) reveals that the mutex is locked, the attempt to lock is aborted (908). In some example approaches, the mutex controller then returns the process identifier of the process currently holding the lock on the mutex (910).

Figure 12:
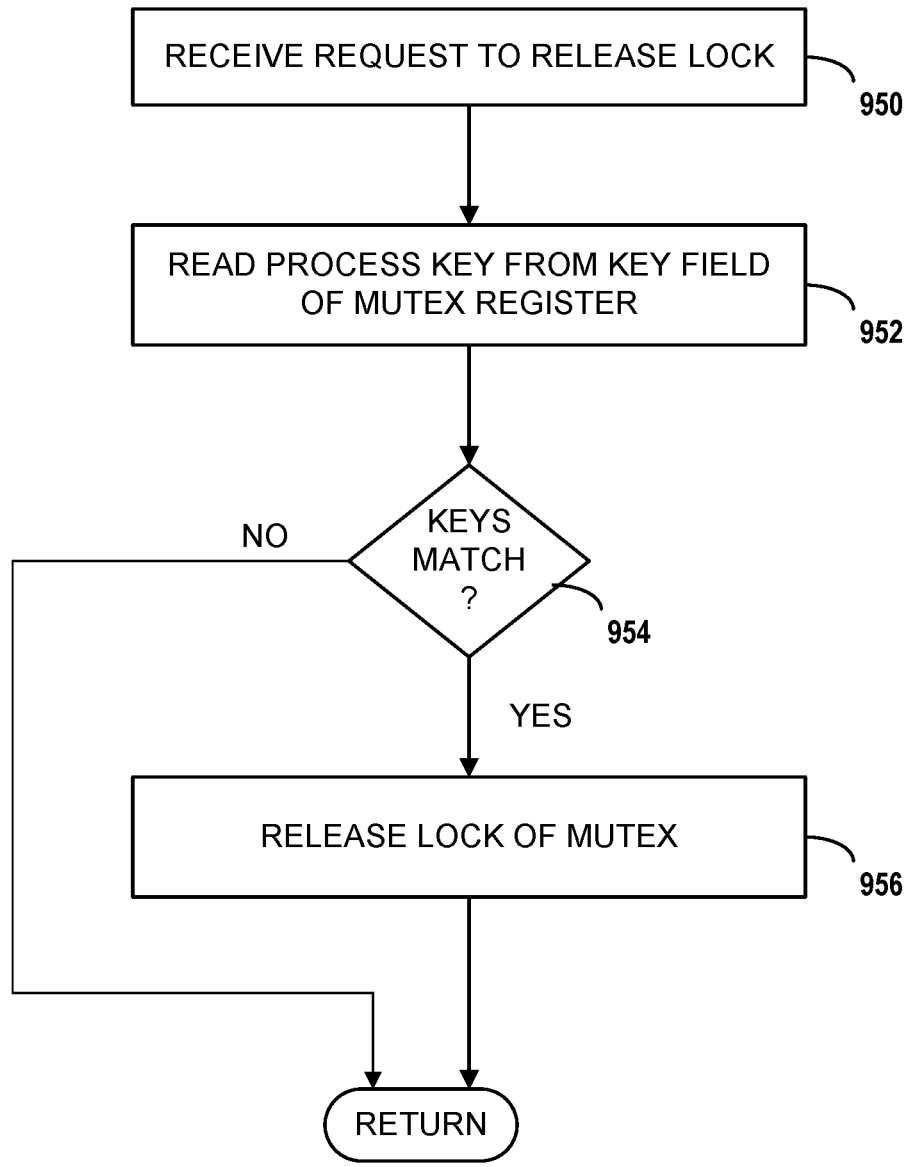
FIG. 12 is a flowchart illustrating an example mutex release operation in the mutex of FIG. 7, in accordance with the techniques of the disclosure.

FIG. 12 is a flowchart illustrating an example mutex release operation in the mutex of FIG. 7, in accordance with the techniques of the disclosure. In one example approach, a software process sends a mutex a request to release a lock on the mutex (950). In some example approaches (as shown in FIG. 10), the request includes a request to write a value of 0 to a lock field of the mutex.

In one example approach, mutex controller 716 retrieves the key value stored in the key field of the mutex (952). Mutex controller 716 then checks to determine if the key passed in the request to release the mutex matches the key value retrieved from the key field of the mutex (954). If the key matches the key field value, the lock is released (956).

As noted above in the discussion of FIG. 10, in some examples, if the disableAuth register 802 is set, then the key is ignored. If Process 20 (or any other process) sends a write command—MutexWrite(MutexID, 0, 456) it can release the mutex that is currently held by process 10 when key matching has been disabled.

The system and techniques described above provide technical advantages that provide practical applications. By enforcing process authentication via the hardware mutex, virtual reality system 10, 600 ensures that only the software processes that can be authenticated are allowed to release the lock on a shared resource. Such an approach ensures stability in the use of a shared resource by preventing inadvertent or malicious release of the mutex lock associated with the shared resource. For example, by preventing artificial reality applications that are concurrently running on a shared rendered scene from accessing resources associated with the scene when the scene locked by another software process, users are provided with a stable multitasking environment with concurrently running artificial reality applications, unlike traditional artificial reality applications that require frequent switching (e.g., closing and restarting) between artificial reality applications on the HMD.

The above described approaches describe shared resource locking mechanisms that make it more difficult to clear the wrong mutex either accidently or deliberately. As noted above, however, a 16-bit key may be vulnerable to brute force attacks and may thus present a security flaw. Techniques are discussed above for making such brute force attacks more difficult by increasing the length of the key, or by using another type of authentication. Despite that, even more robust authentication techniques may be susceptible to a brute force attack. Accordingly, in some example approaches, mutex controller 716 further defends against brute force guesses of the processor-associated key by tracking the number of failed attempts to unlock a given mutex register 718. In one such example approach, mutex controller 718 locks out the process making the release attempts when a threshold number of tries is reached. In one example approach, mutex controller 718 notifies a security subsystem or other process when a threshold number of tries is made by a process other than the process that locked the mutex so that the process can determine if the process is flawed or malicious.

The distributed client/server architecture described above includes mutexes used to limit or prevent simultaneous access to selected resources by applications executing in the distributed client/server architecture. The mutexes employ an authentication mechanism to limit or prevent applications and processes from deliberately or mistakenly unlocking access to resources locked by other applications or processes. The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality VR, an augmented reality AR, a mixed reality MR, a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. An artificial reality system comprising:
a storage device;
one or more mutexes, wherein each mutex is associated with one or more registers; and
processing circuitry connected to the storage device and the one or more mutexes, the processing circuitry configured to:
receive, from a software process having a process identifier and a process authentication key, a request to release a lock on a selected mutex, wherein the request includes the process identifier and the process authentication key of the software process, wherein the process authentication key is different from the process identifier;
read a value stored in a process authentication key field of the one or more hardware registers associated with the selected mutex; and
if the process identifier in the request identifies the software process that has the lock on the selected mutex and if the value stored in a process authentication key field of the one or more hardware registers associated with the selected mutex matches the process authentication key received in the request, release the lock on the selected mutex.

2. The system of claim 1, wherein the processing circuitry is further configured to:

if the value does not match the process authentication key received in the request, increment a counter associated with the software process and the selected mutex but do not release the lock on the selected mutex; and if the counter exceeds a threshold value, generate an error.

3. The system of claim 1, wherein the processing circuitry is further configured to:
if the value does not match the process authentication key received in the request, increment a counter associated with the selected mutex but do not release the lock on the selected mutex; and
if the counter exceeds a threshold value, lock out the process.

4. The system of claim 1, wherein the processing circuitry is further configured to detect a brute force attack on the one or more mutexes.

5. An artificial reality system comprising:
a storage device;
a plurality of mutexes, wherein each mutex is associated with one or more registers; and
processing circuitry connected to the storage device and the plurality of mutexes, the processing circuitry configured to:
receive, from a software process, a request to lock a selected one of the plurality of mutexes, wherein the request includes a process identifier associated with the software process;
determine if the selected mutex is unlocked;
obtain a process authentication key associated with the software process; and
if the selected mutex is unlocked, lock the selected mutex, wherein locking the selected mutex includes storing the process authentication key and the process identifier to one of the one or more hardware registers associated with the selected mutex.

6. The system of claim 5, wherein the processing circuitry configured to obtain the process authentication key associated with the process is further configured to read the process authentication key from a memory location associated with the software process.

7. The system of claim 5, wherein the processing circuitry configured to obtain the process authentication key associated with the software process is further configured to retrieve the process key authentication from the request.

8. The system of claim 5, wherein the processing circuitry is further configured to:
if the selected mutex is locked, increment a counter associated with the software process and the selected mutex; and
if the counter exceeds a threshold value, generate an error.

9. The system of claim 5, wherein the processing circuitry is further configured to:
if the selected mutex is locked, increment a counter associated with the selected mutex; and
if the counter exceeds a threshold value, lock out the software process.

10. The system of claim 5, wherein the processing circuitry is further configured to detect a brute force attack on the one or more mutexes.

11. The system of claim 5, wherein the processing circuitry includes a secure processor, wherein the software process is configured to interrupt the secure processor on detecting a brute force attack on one of the one or more mutexes.

12. The system of claim 5, wherein the processing circuitry includes a secure processor, wherein the software process is configured to notify the secure processor when the selected mutex is locked for longer than a threshold duration.

13. The system of claim 5, wherein the processing circuitry includes a secure processor and a mutex controller, and
wherein the mutex controller interrupts the secure processor when one of the plurality of mutexes is locked for longer than the threshold duration for the respective mutex.

14. The system of claim 13, wherein the threshold duration is configurable by the secure processor.

15. The system of claim 13, wherein interrupting the secure processor includes sending information to the secure processor identifying the locked mutex and the software process holding the locked mutex.

16. The system of claim 15, wherein the secure processor is configured to send a command to the mutex controller to unlock the locked mutex, and
wherein the mutex controller is configured to receive the command from the secure processor and to unlock the locked mutex if the command identifies the locked mutex and if the secure processor has permission to unlock the locked mutex.

17. The system of claim 5, wherein the processing circuitry is further configured to:
receive a request to release the lock on the selected mutex, wherein the request includes a process authentication key;
read the stored process authentication key from the one of the one or more hardware registers associated with the selected mutex; and
if the stored process authentication key read from the one or more hardware registers associated with the selected mutex matches the process authentication key received with the request to release the lock on the selected mutex, release the lock on the selected mutex.

18. A method comprising:
receiving, from a software process, a request to lock a mutex, the mutex implemented in one or more hardware registers, wherein the request includes a process identifier associated with the software process;
obtaining a process authentication key associated with the software process;
determining if the mutex is unlocked; and
if the mutex is unlocked, locking the mutex, wherein locking the mutex includes storing the process authentication key and the process identifier to one of the one or more hardware registers of the mutex.

19. The method of claim 18, wherein the software process executes on one or more processors and wherein the process identifier identifies one of more of the processors on which the software process is executing.

20. The method of claim 18, wherein the method further comprises:
if the mutex is locked, incrementing a counter associated with the software process and the mutex; and
if the counter exceeds a threshold value, generating an error.

21. The method of claim 18, wherein the method further comprises:
if the mutex is locked, incrementing a counter associated with the mutex; and
if the counter exceeds a threshold value, locking out the software process.

22. The method of claim 18, wherein the method further comprises detecting a brute force attack on the mutex.

23. A method comprising:
receiving, from a software process having a process identifier and a process authentication key, a request to release a lock on a mutex, the mutex implemented using one or more hardware registers, wherein the request includes the process identifier and the process authentication key, wherein the process authentication key is different from the process identifier;
reading a value stored in a process authentication key field of one of the one or more hardware registers of the mutex; and
if the process identifier in the request identifies the software process that has the lock on the mutex and if the value stored in the process authentication key field matches the process authentication key of the request, releasing the lock on the mutex.

24. The method of claim 23, wherein the method further comprises detecting a brute force attack on the mutex.

25. The method of claim 23, wherein the process authentication key of the request does not match the value in the key field when the software process is a trusted application that mistakenly attempts to release the lock of another software process.

26. The method of claim 23, wherein the process authentication key of the request does not match the value in the key field when the software process is a malicious or unsecured application that deliberately attempts to release the lock of another software process.

27. A non-volatile computer-readable storage medium comprising instructions that, when executed by a processor, configure the processor to:
receive, from a software process, a request to lock a mutex, the mutex implemented in one or more hardware registers, wherein the request includes a process identifier associated with the software process;
obtain a process authentication key associated with the software process;
determine if the mutex is unlocked; and
if the mutex is unlocked, lock the mutex, wherein locking the mutex includes storing the process authentication key and the process identifier to one of the one or more hardware registers of the mutex.

28. The non-volatile computer-readable storage medium of claim 27, wherein the instructions include instructions that, when executed by a processor, further configure the processor to:
receive a request to release the lock on the mutex, wherein the request includes a process identifier and a process authentication key;
read a value stored in a process authentication key field of one of the one or more hardware registers associated with the mutex; and
if the process identifier in the request identifies the software process that has the lock on the mutex and if the value matches the process authentication key received with the request to release the mutex, release the lock on the mutex.

29. A non-volatile computer-readable storage medium comprising instructions that, when executed by a processor, configure the processor to:
receive, from a software process having a process identifier and a process authentication key, a request to release a lock on a mutex, the mutex implemented using one or more hardware registers, wherein the request includes the process identifier and the process authentication key, wherein the process authentication key is different from the process identifier;
read a value stored in a process authentication key field of one of the one or more hardware registers of the mutex; and
if the value matches the process authentication key of the request, releasing the lock on the mutex.

* * * * *